(12) United States Patent
Aibara

(10) Patent No.: US 8,937,573 B2
(45) Date of Patent: Jan. 20, 2015

(54) SATELLITE RADIOWAVE RECEIVING DEVICE

(75) Inventor: Takehiro Aibara, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 324 days.

(21) Appl. No.: 13/615,313

(22) Filed: Sep. 13, 2012

(65) Prior Publication Data

US 2013/0088388 A1    Apr. 11, 2013

(30) Foreign Application Priority Data

Oct. 6, 2011    (JP) .................................. 2011-221525

(51) Int. Cl.
| | | |
|---|---|---|
| G01S 19/35 | (2010.01) | |
| G01S 19/29 | (2010.01) | |
| G01S 19/30 | (2010.01) | |
| G01S 19/37 | (2010.01) | |

(52) U.S. Cl.
CPC ................. *G01S 19/29* (2013.01); *G01S 19/30* (2013.01); *G01S 19/37* (2013.01)
USPC .................................................. 342/357.75

(58) Field of Classification Search
USPC ........................................ 342/357.75, 357.77
See application file for complete search history.

(56) References Cited

U.S. PATENT DOCUMENTS

| | | | |
|---|---|---|---|
| 2002/0004392 A1 | 1/2002 | Farine et al. | |
| 2005/0234713 A1* | 10/2005 | Yamamoto et al. | ........... 704/224 |
| 2006/0071851 A1* | 4/2006 | Graas et al. | ............. 342/357.14 |

FOREIGN PATENT DOCUMENTS

| | | |
|---|---|---|
| JP | 2001-159670 A | 6/2001 |
| JP | 2002-122655 A | 4/2002 |

\* cited by examiner

*Primary Examiner* — Harry Liu
(74) *Attorney, Agent, or Firm* — Holtz, Holtz, Goodman & Chick PC

(57) ABSTRACT

A satellite radiowave receiving device includes: a receiving unit which receives a radiowave signal; a conversion unit which converts the radiowave signal into digital data; a detection/arithmetic operation unit which detects the satellite signal; a capturing unit which searches a reception frequency; a setting unit which sets a second bit number, and the number of parallel processing in which the predetermined arithmetic operation can be executed in parallel; and a specifying unit which specifies the reception frequency of the satellite signal, and the detection/arithmetic operation unit executes the predetermined arithmetic operation in parallel for the input signal data related to reception frequencies of which number is equal to or less than a predetermined number of maximum parallel processing, and the number of parallel processing is determined so that a total bit number is equal to or less than the maximum bit number/the number of maximum processing.

20 Claims, 13 Drawing Sheets

SATELLITE RADIOWAVE RECEIVING DEVICE

CROSS-REFERENCE TO RELATED APPLICATIONS

This application is based upon and claims the benefit of priority from the prior Japanese Patent Application No. 2011-221525, filed on Oct. 6, 2011, the entire contents of which are incorporated herein by reference.

BACKGROUND OF THE INVENTION

1. Field of the Invention

The present invention relates to a satellite radiowave receiving device that receives a radiowave from a positioning satellite and obtains a satellite signal.

2. Description of Related Art

Heretofore, there has been a portable apparatus such as an electronic wrist watch, which includes a receiving device that receives a radiowave transmitted from a positioning satellite according to a global navigation satellite system (GNSS) including a global positioning system (GPS), and is capable of obtaining time information and position information. In the portable apparatus as described above, based on the obtained time information and position information, a displayed time can be corrected, and a time zone can be set.

A satellite signal to be outputted from the positioning satellite is subjected to spread modulation by using an intrinsic spreading code (pseudo noise) set for each positioning satellite, and is transmitted on the radiowave. In the event of receiving this radiowave, this received radiowave is subjected to despreading by using the spreading code set in the positioning satellite as a transmission source of the received radiowave concerned, whereby the satellite signal from this positioning satellite is decoded and obtained. Each positioning satellite moves on a predetermined orbit, and in the receiving device, which does not have orbit information of such positioning satellites, and does not grasp in advance which positioning satellite is in a visible state and whether or not it is possible to receive a radiowave therefrom, despreading processing is performed for the received signal in the received radiowave by spreading codes of all of the positioning satellites in a round robin manner, whereby the satellite signal is detected, and the positioning satellite from which the radiowave is receivable is identified. In such a way, capturing processing is performed.

For the capturing processing as described above, heretofore, a matched filter (sliding correlator) has been used, and moreover, pieces of the despreading processing by the spreading codes of the plurality of satellites are performed in parallel, whereby acceleration of the capturing processing is achieved. Furthermore, Japanese Patent Laid-Open Publication No. 2001-159670 discloses a technology, in which a plurality of memories performing reading and writing of data are provided, and the plurality of memories are allowed to read and write data in parallel of the despreading processing, which are to be performed simultaneously in parallel, whereby a delay in I/O processing for arithmetic operation processing is prevented.

Moreover, Japanese Patent Laid-Open Publication No. 2002-122655 (corresponding to US 2002/0004392 A1) discloses a technology, in which power supply periods and clock signal frequencies for a correlator performing the capturing processing and a microprocessor performing calculation processing for a position and a time based on obtained data are individually subjected to setting changes according to needs, whereby a power consumption is reduced.

The radiowave transmitted from each positioning satellite is received at a frequency different from a transmission frequency owing to the Doppler effect brought by the fact that the positioning satellite moves around the earth at a high speed. Hence, in the event of receiving the radiowave from the positioning satellite by the receiving device that does not have current position data and the orbit information of the positioning satellite, it is necessary to search such a reception frequency of the radiowave from the positioning satellite within a frequency range that can be changed owing to the Doppler effect. As a result, a time required for the capturing processing is increased in proportion to a width of the reception frequency for which the search is performed.

However, in terms of a ratio, a storage unit that stores such received data in the matched filter occupies a larger size in a capturing processing circuit in comparison with other portions for use in the capturing processing. Hence, when such storage units for processing the received data related to a plurality of reception frequencies in parallel are individually provided to attempt achievement of the acceleration of the capturing processing, a scale of a circuit that performs the capturing processing is increased.

The present invention is a satellite radiowave receiving device capable of shortening the time of receiving the radiowaves from the positioning satellites without enlarging such a circuit scale.

SUMMARY OF THE INVENTION

According to an aspect of the present invention, there is provided a satellite radiowave receiving device including:

a receiving unit which receives a radiowave signal of a frequency band including a transmission frequency of a satellite signal transmitted on a radiowave from a positioning satellite;

a conversion unit which converts the radiowave signal received by the receiving unit into digital data;

a detection/arithmetic operation unit which performs a predetermined arithmetic operation to detect the satellite signal in a predetermined reception frequency from the digital data;

a capturing unit which:
  (i) allows the detection/arithmetic operation unit to sequentially obtain input signal data related to reception frequencies, the reception frequencies being set at a first frequency interval across a first frequency range, by every 1 reception frequency at a first bit number equal to or less than a maximum bit number preset per data sample from the digital data, and to perform the predetermined arithmetic operation; and
  (ii) searches a reception frequency at which the satellite signal is detected based on a result of the predetermined arithmetic operation;

a setting unit which sets:
  (i) a second bit number equal to or less than the first bit number, the second bit number being determined in response to reception intensity in an event where the satellite signal is detected by the capturing unit; and
  (ii) the number of parallel processing in which the detection/arithmetic operation unit is capable of executing the predetermined arithmetic operation in parallel from the input signal data of the second bit number per data sample; and a specifying unit which:
  (i) allows the detection/arithmetic operation unit to obtain input signal data, the input signal data being related to reception frequencies set at a second frequency interval narrower than the first frequency interval across a second frequency range including the reception frequency at which the satellite signal is detected by the capturing unit, by every reception frequency of the number of parallel processing at the second bit number per data sample from the digital data, and to perform the predetermined arithmetic operation in parallel; and (ii) specifies the reception frequency of the satellite signal based on a result of the predetermined arithmetic operation, and the detection/arithmetic operation unit is capable of executing the predetermined arithmetic operation in parallel for the input signal data related to reception frequencies of which number is equal to or less than a predetermined number of maximum parallel processing, and the number of parallel processing is determined so that a total bit number of the data samples of which number is the number of parallel processing is equal to or less than the maximum bit number and equal to or less than the number of maximum processing.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENT

A description is made below of a satellite radiowave receiving device of an embodiment of the present invention based on the drawings.

Figure 1:
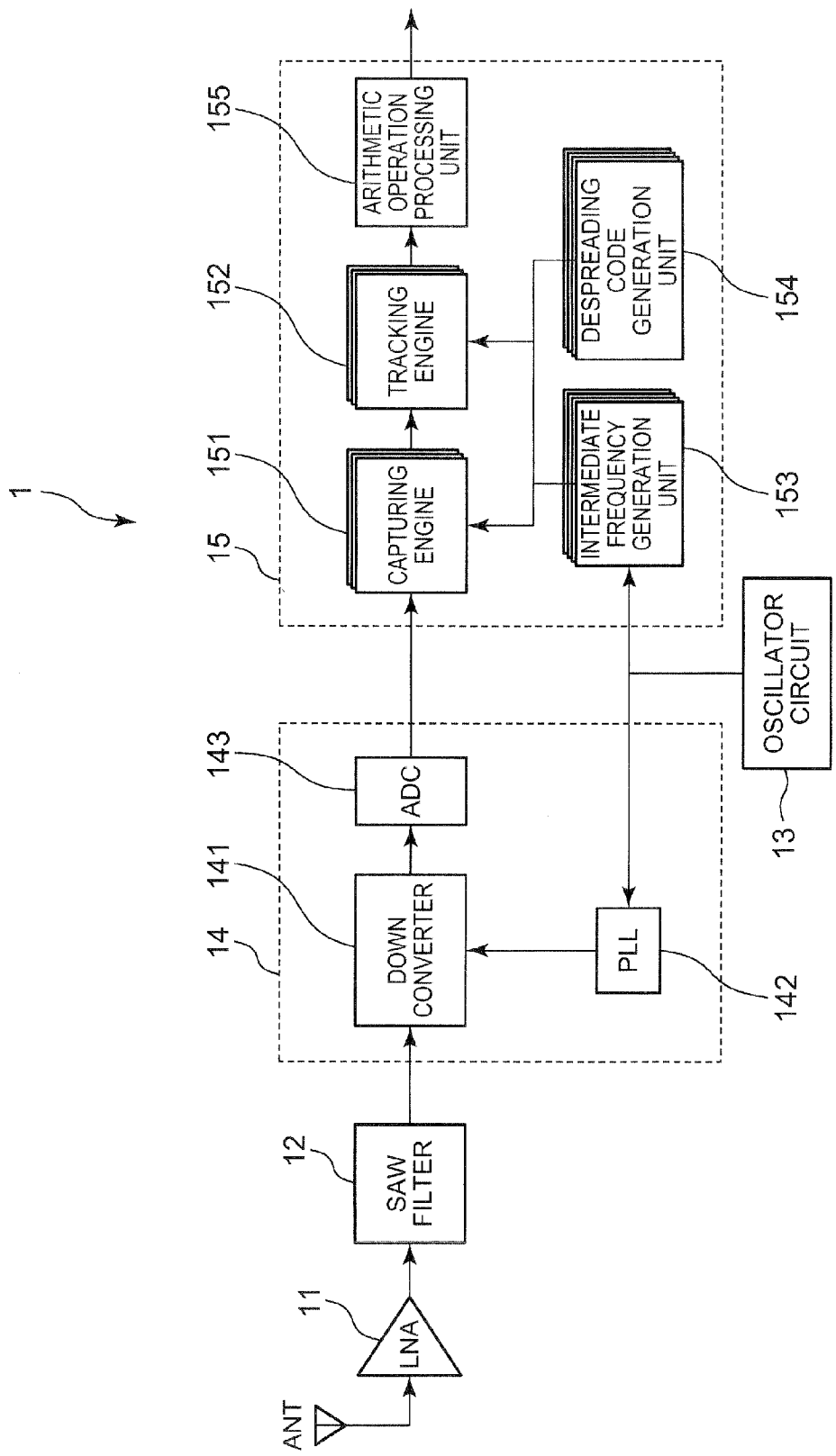
FIG. 1 is a block diagram showing a configuration of a satellite radiowave receiving device of an embodiment of the present invention and a flow of a signal therein.

FIG. 1 is a block diagram showing a configuration of a satellite radiowave receiving device of this embodiment and a flow of a signal therein.

This satellite radiowave receiving device 1 is mounted, for example, on a portable watch, and outputs time information based on a received radiowave from a GPS satellite. The satellite radiowave receiving device 1 includes a receiving antenna ANT, a low noise amplifier (LNA) 11, a narrow band filter 12, an oscillator circuit 13, an RF unit 14, a base band unit 15 and the like.

The receiving antenna ANT is an antenna capable of receiving a radiowave of the L1 band (1.57542 GHz), which is transmitted from a GPS satellite. Moreover, for example, the narrow band filter 12 is an SAW filter (surface acoustic radiowave filter), and has a band of approximately 1 to 10 MHz. Such a band width is sufficiently wider in comparison with a magnitude of deviation between a transmission frequency from the GPS satellite and a reception frequency by the satellite radiowave receiving device 1, which is caused by the Doppler effect and an error in an instrument of the satellite radiowave receiving device 1. A receiving unit is composed of these receiving antenna ANT, low noise amplifier 11 and band filter 12.

For the oscillator circuit 13, for example, a crystal oscillator (TCXO) including a temperature compensation circuit is used in general. For example, this oscillator circuit 13 generates and outputs a signal of 16.368 MHz as a reference frequency.

The RF unit 14 converts a received signal (radiowave signal) of a carrier frequency, which is based on the received radiowave, into a signal of an intermediate frequency band, converts the signal concerned into digital data, and outputs the digital data. This RF unit 14 includes a down converter 141, a phase locked loop (PLL) 142, an analog/digital converter (ADC) 143 (converter), and the like.

The down converter 141 is a circuit that converts the signal of the received radiowave into the signal of the intermediate frequency, and for example, includes a mixer and a narrow band filter. The intermediate frequency IF0 is, for example, a value of approximately 4 MHz.

The PLL 142 is a circuit that inputs a signal of a predetermined local frequency to the mixer of the down converter 141 in synchronization with the output signal of the oscillator circuit 13, and for example, includes a voltage controlled oscillator (VCO), a prescaler, a phase comparator and the like. The VCO generates a signal of a frequency to be determined by a direct current voltage to be inputted thereto, and outputs the generated signal to the mixer of the down converter 141. The prescaler divides the frequency of the output signal of the VCO, and outputs the divided frequency to the phase comparator. The phase comparator compares a phase of the frequency-divided signal outputted by the VCO and a phase of the output signal of the oscillator circuit with each other, and based on a difference between these phases, changes the direct current voltage to be outputted to the VCO. The local frequency is controlled with such a configuration, whereby it is made possible to stably output a signal of a constant frequency to the down converter 141.

The ADC 143 converts the received radiowave signal, which is converted into the signal of the intermediate frequency band and outputted from the down converter 141, into a digital value by a predetermined sampling frequency, and outputs the digital value as digital data to the base band unit 15. Each digital value to be outputted from the ADC 143 is not particularly limited; however, a size of the data thereof is set as appropriate in response to a storage capacity and processing capability of the based band unit 15, which will be described later. In the satellite radiowave receiving device 1 of this embodiment, one digital value (data sample) is data of 12 bits.

The base band unit 15 includes a capturing engine 151, a tracking engine 152, an intermediate frequency generation unit 153 (local frequency oscillation unit), a despreading code generation unit 154, an arithmetic operation processing unit 155 and the like. Moreover, the base band unit 15 further includes: a controller 156 (capturing unit, setting unit, specifying unit) that controls operations of the base unit 15 and includes a central processing unit (CPU) and the like; and a memory 157 (arithmetic operation result storage unit) such as a random access memory (RAM) that temporarily stores data (refer to FIG. 2).

The capturing engine 151 is a circuit that detects a satellite signal from the digital signal (inputted signal data) inputted from the RF unit 14 and performs arithmetic operation processing for specifying a reception frequency thereof and a satellite identification number. Details of the capturing engine 151 will be described later.

The tracking engine 152 is a circuit that detects a phase synchronization point between the satellite signal to be received so as to correspond to the reception frequency and the satellite identification number, which are specified in the arithmetic operation processing by the capturing engine 151, and an internal clock of the satellite radiowave receiving device 1, and moreover, continuously outputs the satellite signal demodulated by maintaining this phase synchronization.

The intermediate frequency generation unit 153 generates intermediate frequency local signals (frequency signals), and outputs the generated intermediate frequency local signals to the capturing engine 151 or the tracking engine 152. The intermediate frequency generation unit 153 provided in the base band unit 15 in the satellite radiowave receiving device 1 of this embodiment is composed of three numerically-controlled oscillators (NCOs) 153a, 153b and 153c (refer to FIG. 2). Frequencies of the intermediate frequency local signals to be generated by the NCOs 153a to 153c are independently and minutely controlled by setting values to be inputted to the NCOs 153a to 153c separately from one another. Moreover, each of the NCOs 153a to 153c is composed to be capable of outputting an in-phase local signal and a quadrature-phase local signal orthogonal to this in-phase local signal.

The despreading code generation unit 154 generates a spreading code, and outputs this spreading code to the capturing engine 151 or the tracking engine 152. In the despreading code generation unit 154 in the satellite radiowave receiving device 1 of this embodiment, when the satellite identification number is designated, a C/A code used as a spreading code in the positioning satellite corresponding to this satellite identification number is generated. The C/A code is composed of an array of 1,023 pieces of binary data (chip) to be transmitted during a period of a 1-ms cycle. A detection/arithmetic operation unit is composed of these capturing engine 151 and despreading code generation unit 154.

The arithmetic operation processing unit 155 decodes the satellite signal, which is demodulated and outputted by the tracking engine 152, and obtains time data. Moreover, according to needs, the arithmetic operation processing unit 155 calculates a position of the GPS satellite, and calculates a current position of the satellite radiowave receiving device 1, and then outputs the data thus obtained and the data thus calculated in predetermined formats.

Next, a description is made of an internal configuration of the capturing engine 151.

Figure 2:
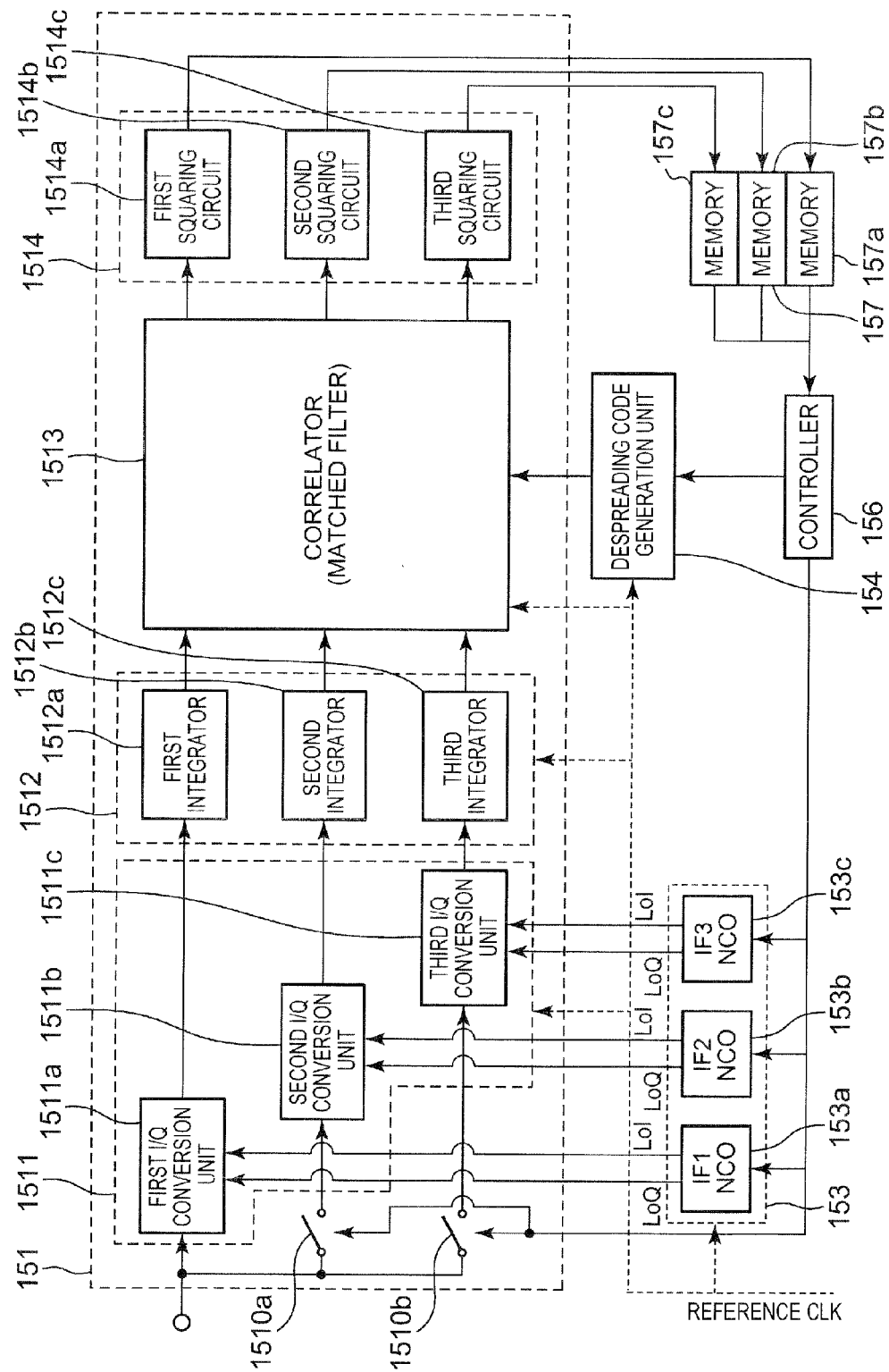
FIG. 2 is a view showing configurations of a capturing engine and portions related to the capturing engine.

FIG. 2 is a view showing configurations of the capturing engine 151 and portions related to the capturing engine 151 concerned.

The capturing engine 151 includes an I/Q conversion unit 1511, an integration unit 1512, a correlator 1513, a squaring circuit 1514 and the like.

The I/Q conversion unit 1511 separates two-component base band signals, which are orthogonal to each other, from the received radiowave signal converted into the digital signal of the intermediate frequency band in the RF unit 14, and outputs the two-component base band signals concerned. The I/Q conversion unit 1511 includes a first I/Q conversion unit 1511a, a second I/Q conversion unit 1511b, and a third I/Q conversion unit 1511c. Among them, the signal is always inputted to the first I/Q conversion unit 1511a, and meanwhile, with regard to the second I/Q conversion unit 1511b and the third I/Q conversion unit 1511c, whether or not to input the signal thereto is controlled by ON/OFF of switches 1510a and 1510b to be controlled by the controller 156, respectively.

The integration unit 1512 integrates the respective base band signals, which are outputted from the I/Q conversion unit 1511, across a length of one chip of the C/A code, that is, 1/1,023 ms (to 1 μs), and individually outputs the integrated base band signals as I-phase data and Q-phase data. The integration unit 1512 includes a first integrator 1512a, a second integrator 1512b, and a third integrator 1512c. The respective first, second and third integrators 1512a, 1512b and 1512c integrate the base band signals, which are outputted from the first I/Q conversion unit 1511a, the second I/Q conversion unit 1511b and the third I/Q conversion unit 1511c, across the length of one chip of the C/A code, and output the integrated base band signals as I-phase data FI1 to FI3 and Q-phase data FQ1 to FQ3. Alternatively, these integration units 1512 may be low-pass filters which cut alternating current components with cycles shorter in comparison with the length of one chip of the C/A code.

Figure 3A:
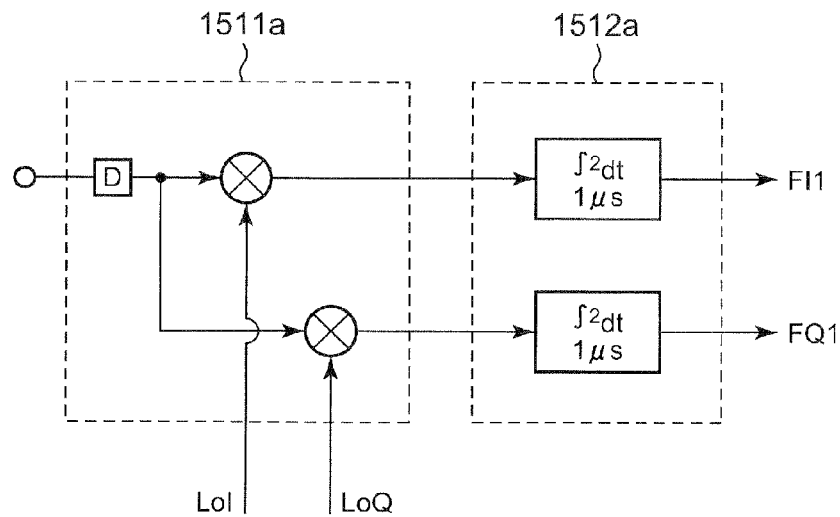
FIGS. 3A and 3B are views explaining an I/Q converter, an integrator and a squaring circuit in the capturing engine.
Figure 3B:
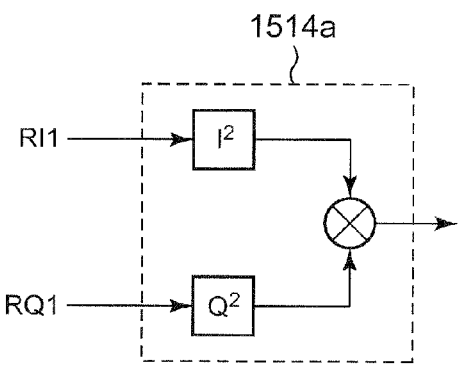

FIG. 3A is a view explaining the first I/Q conversion unit 1511a and the first integrator 1512a. FIG. 3B is a view explaining the first squaring circuit 1514a.

As shown in FIG. 3A, in two mixers, the first I/Q conversion unit 1511a individually mixes an I-phase local signal and Q-phase local signal of an intermediate frequency IF1, which are outputted from the NCO 153a, with the digital signal inputted thereto, and outputs an I-phase base band signal and Q-phase base band signal of a reception frequency corresponding to the intermediate frequency IF1. The outputted signals are sent to the first integrator 1512a, and integrated data for one chip are outputted as the I-phase data FI1 and the Q-phase data FQ1. The second I/Q conversion unit 1511b and the third I/Q conversion unit 1511c have the same internal configurations as that of the first I/Q conversion unit 1511a, and in two mixers in each thereof, individually mixes I-phase local signals and Q-phase local signals of intermediate frequencies IF2 and IF3, which are outputted from the NCOs 153b and 153c, with the digital signals inputted thereto. Then, I-phase base band signals and Q-phase base band signals of reception frequencies corresponding to the intermediate frequencies IF2 and IF3, the base band signals being generated in these mixers and outputted therefrom, are sent to the second integrator 1512b and the third integrator 1512c, and integrated data each for one chip are outputted as the I-phase data FI2 and FI3 and the Q-phase data FQ2 and FQ3.

Figure 4:
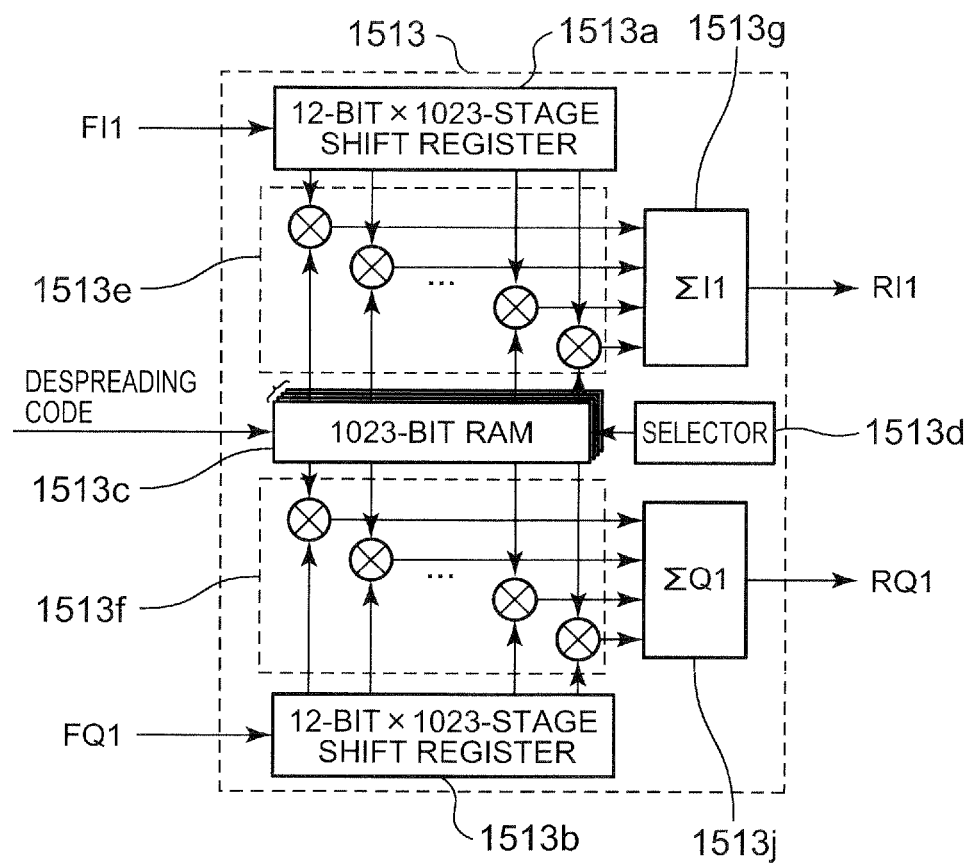
FIG. 4 is a view explaining a correlator in the capturing engine.
Figure 5A:
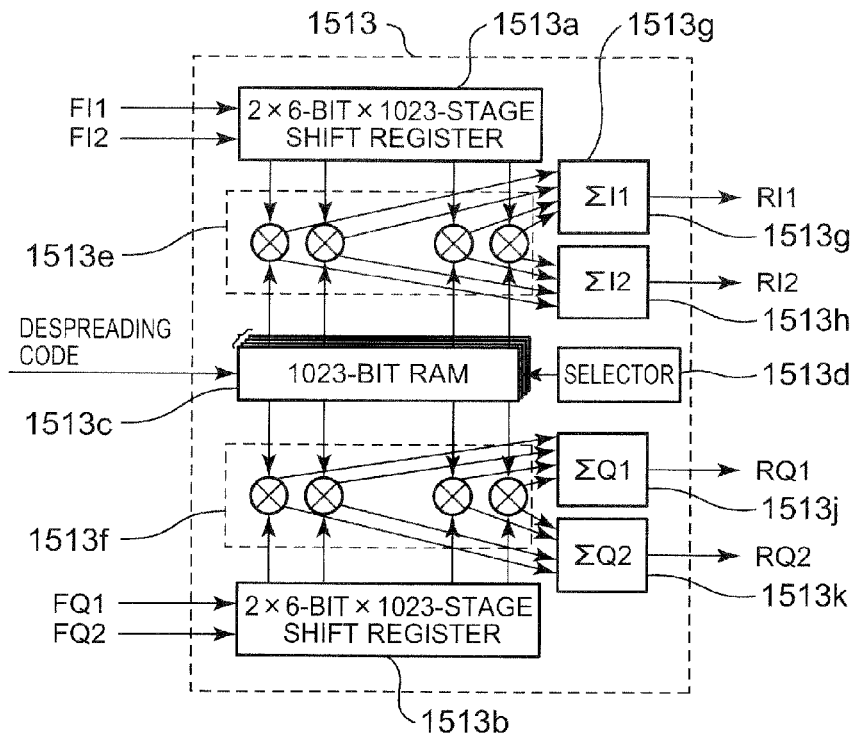
FIGS. 5A and 5B are views explaining an operation mode of the correlator in a second search operation.
Figure 5B:
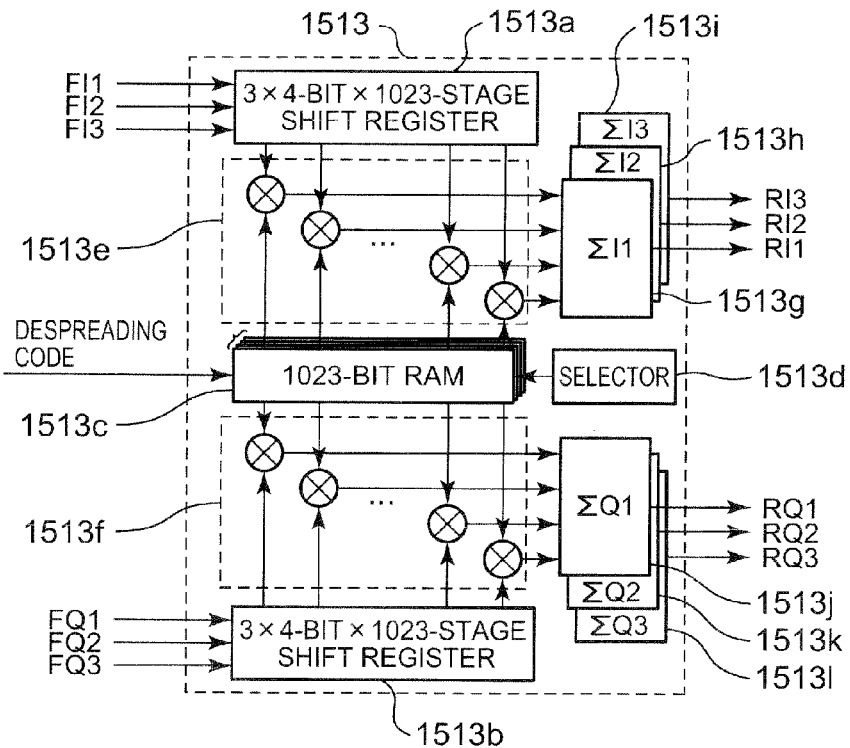

FIG. 4, FIG. 5A and FIG. 5B are explaining the correlator 1513 in the capturing engine 151.

For example, the correlator 1513 is a matched filter. This correlator 1513 holds the output data (I-phase data FI1 to FI3, Q-phase data FQ1 to FQ3) of the integration unit 1512 and the C/A code generated in the despreading code generation unit 154 for each of cycles (1,023 pieces) of the C/A code, and individually obtains correlations between the respective values of the I-phase data FI1 to FI3 and the Q-phase data FQ1 to FQ3 and the respective values of the C/A codes. As shown in FIG. 4, FIG. 5A and FIG. 5B, the correlator 1513 includes shift registers 1513a and 1513b, a RAM 1513c, a selector 1513d, multiplier groups 1513e and 1513f, and adders 1513g to 1513l. Among them, the adders 1513h, 1513i, 1513k and 1513l are not sometimes used depending on contents of processing operations in the shift registers 1513a and 1513b and the multiplier groups 1513e and 1513f as will be described later.

In each of the shift registers 1513a and 1513b, data of 12 bits (maximum bit number) is held across 1,023 stages. To the shift register 1513a, the I-phase data FI1 to FI3 are inputted from the integration unit 1512. Each of the shift registers 1513a and 1513b is configured to be capable of switching among a mode of holding 1,023 pieces of data of 12 bits per piece (one data sample), a mode of holding 1,023 pieces of data of 6 bits per data sample in two parallel rows, and a mode of holding 1,023 pieces of data of four bits per data sample in three parallel rows.

The switching among such data holding modes in the shift registers 1513a and 1513b is controlled by ON/OFF of the switches 1510a and 1510b. During a period while both of the switches 1510a and 1510b are OFF, as shown in FIG. 4, the 12-bit I-phase data FI1 and the 12-bit Q-phase data FQ1, which are outputted from the first integrator 1512a, are directly inputted in order to the shift registers 1513a and 1513b, respectively, and are accumulated by every 1,023 pieces. At this time, the data are not inputted from the second integrator 1512b and the third integrator 1512c to the shift registers 1513a and 1513b.

Figure 6:
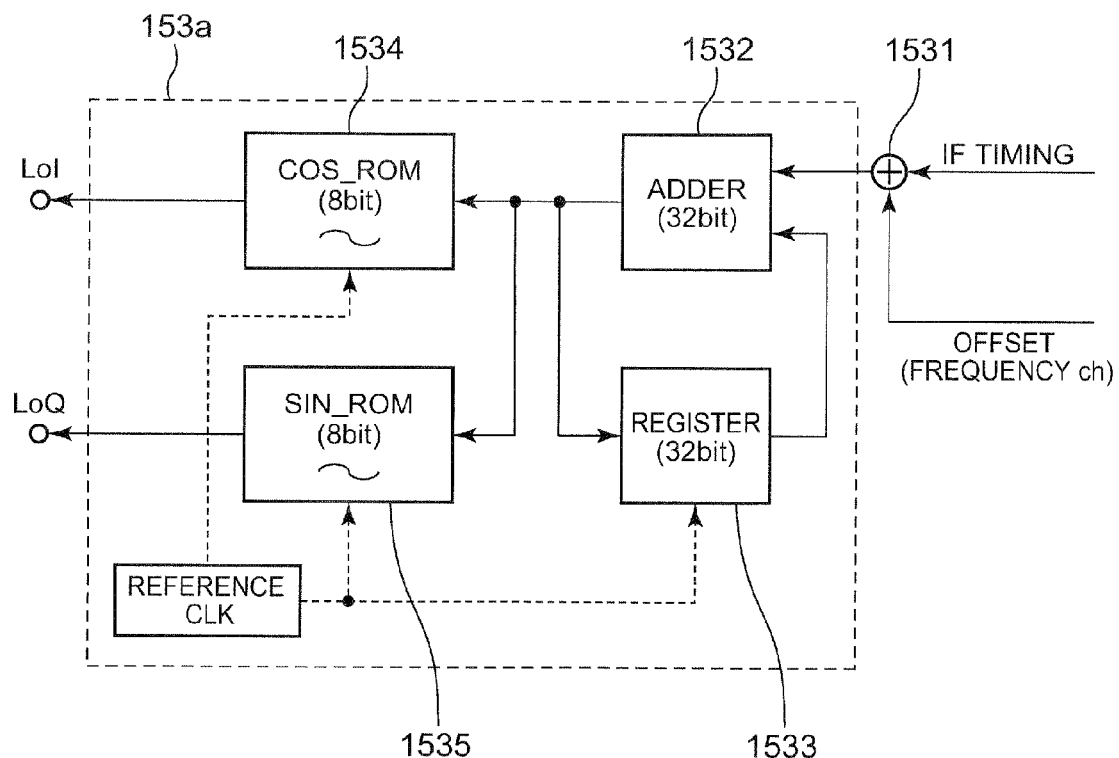
FIG. 6 is a block diagram explaining a configuration of an NCO provided in an intermediate frequency generation unit.

Meanwhile, during a period while the switch 1510a is ON and the switch 1510b is OFF, as shown in FIG. 5A, 6-bit data which are based on the 12-bit I-phase data FI1 and FI2 outputted from the first integrator 1512a and the second integrator 1512b, respectively are inputted in parallel to the shift register 1513a. Moreover, 6-bit data which are based on the 12-bit Q-phase data FQ1 and FQ2 outputted from the first integrator 1512a and the second integrator 1512b, respectively are inputted in parallel to the shift register 1513b. Then, the data, each number of which is 1,023, are accumulated in series in an order of being inputted to the shift registers 1513a and 1513b. At this time, the data are not inputted from the third integrator 1512c to the shift registers 1513a and 1513b.

Moreover, during a period while both of the switches 1510a and 1510b are ON, as shown in FIG. 5B, 4-bit data which are based on the 12-bit I-phase data FI1 to FI3 outputted from the first integrator 1512a, the second integrator 1512b and the third integrator 1512c, respectively are inputted in parallel to the shift register 1513a. Moreover, 4-bit data which are based on the 12-bit Q-phase data FQ1 to FQ3 outputted from the first integrator 1512a, the second integrator 1512b and the third integrator 1512c, respectively are inputted in parallel to the shift register 1513b. Then, the data, each number of which is 1,023, are accumulated in series in an order of being inputted to the shift registers 1513a and 1513b.

In the event of converting the data, which are to be inputted from the first integrator 1512a and the second integrator 1512b to the shift registers 1513a and 1513b, from the 12-bit data to the 6-bit data, for example, a configuration can be adopted so that only high-order 6 bits in the 12-bit data can be obtained. Moreover, in the event of converting the data, which are to be inputted from the first integrator 1512a, the second integrator 1512b and the third integrator 1512c to the shift registers 1513a and 1513b, from the 12-bit data to the 4-bit data, for example, a configuration can be adopted so that only high-order 4 bits in the 12-bit data can be obtained.

To the RAM 1513c, 1,023 chips of the binary data, which are equivalent to an amount of one cycle of the C/A code, are inputted from the despreading code generation unit 154. In the RAM 1513c of this embodiment, it is possible to simultaneously store the C/A codes for use in at most four GPS satellites, and the C/A code of any one GPS satellite is selected by the selector 1513d from among these stored C/A codes. The binary data to be stored in the RAM 1513c are not particularly limited; however, are represented by 1-bit data for the purpose of downsizing of the satellite radiowave receiving device 1 and simplification of the arithmetic operations.

The multiplier group 1513e multiplies the respective chip data, which indicate the C/A codes of the GPS satellites, the C/A codes being selected by the selector 1513d from among the C/A codes stored in the RAM 1513c, and the respective I-phase data, which are inputted in the same phases, that is, the same orders individually inputted from the first integrator 1512a, the second integrator 1512b and the third integrator 1512c and stored in the shift register 1513a. Then, the multiplier group 1513e outputs results of the multiplications individually to the adders 1513g to 1513i. Meanwhile, the multiplier group 1513f multiplies the respective chip data, which indicate the C/A codes of the GPS satellites, the C/A codes being selected by the selector 1513d from among the C/A codes stored in the RAM 1513c, and the respective I-phase data, which are inputted in the same phases inputted from the first integrator 1512a, the second integrator 1512b and the third integrator 1512c and stored in the shift register 1513b. Then, the multiplier group 1513f outputs results of the multiplications individually to the adders 1513j to 1513l.

As shown in FIG. 5B, the adders 1513g and 1513j individually obtain total sums of such multiplication values related to the I-phase data FI1 and the Q-phase data FQ1 from the first integrator 1512a, which are inputted from the multiplier groups 1513e and 1513f. Then, the adders 1513g and 1513j output the obtained values as a correlation value RI1 of the I-phase data and a correlation value RQ1 of the Q-phase data to the first squaring circuit 1514a. Moreover, the adders 1513h and 1513k individually obtain total sums of such multiplication values related to the I-phase data FI2 and the Q-phase data FQ2 from the second integrator 1512b, which are inputted from the multiplier groups 1513e and 1513f. Then, the adders 1513h and 1513k output the obtained values as a correlation value RI2 of the I-phase data and a correlation value RQ2 of the Q-phase data to the second squaring circuit 1514b. Moreover, the adders 1513i and 1513l individually obtain total sums of such multiplication values related to the I-phase data FI3 and the Q-phase data FQ3 from the third integrator 1512c, which are inputted from the multiplier groups 1513e and 1513f. Then, the adders 1513i and 1513l output the obtained values as a correlation value RI3 of the I-phase data and a correlation value RQ3 of the Q-phase data to the third squaring circuit 1514c.

Here, during the period while both of the switches 1510a and 1510b are OFF, as shown in FIG. 4, based on the output from the first integrator 1512a, the data are inputted only to the adders 1513g and 1513j, and the adders 1513h, 1513i, 1513k and 1513l are not used. Moreover, during the period while the switch 1510a is ON and the switch 1510b is OFF, as shown in FIG. 5A, based on the output from the second integrator 1512b in addition to those of the adders 1513g and 1513*j*, the data are also inputted to the adders 1513*h* and 1513*k*, and the adders 1513*i* and 1513*l* are not used.

The squaring circuit 1514 is composed of the first squaring circuit 1514*a*, the second squaring circuit 1514*b* and the third squaring circuit 1514*c*. As shown in FIG. 3B, the first squaring circuit 1514*a* individually squares the correlation value RI1 of the I-phase data and the correlation value RQ1 of the Q-phase data, which are outputted from the correlator 1513, and adds the correlation values thus squared to each other. Moreover, the second squaring circuit 1514*b* individually squares the correlation value RI2 of the I-phase data and the correlation value RQ2 of the Q-phase data, and adds the correlation values thus squared to each other. Furthermore, the third squaring circuit 1514*c* individually squares the correlation value RI3 of the I-phase data and the correlation value RQ3 of the Q-phase data, and adds the correlation values thus squared to each other. Results of these calculations are sent to the memory 157 of the base band unit 15 independently of one another, and are stored predetermined addresses to be described later. Note that the first squaring circuit 1514*a*, the second squaring circuit 1514*b* and the third squaring circuit 1514*c* may output square roots of the obtained sums of the squares.

FIG. 6 is a block diagram showing configurations of the NCOs 153*a* to 153*c* which the intermediate frequency generation unit 153 includes.

The NCOs 153*a* to 153*c* have the same configurations, and here, a description is made of the one NCO 153*a*. The NCO 153*a* of this embodiment adopts a circuit configuration of a direct digital synthesizer (DDS), and includes adders 1531 and 1532, a register 1533, a COS_ROM 1534, a SIN_ROM 1535 and the like.

The adder 1531 receives a value of set IF timing and an offset value, and adds these values to each other. Such an additional value obtained in the adder 1531 is sent to the adder 1532. The adder 1532 adds this value, which is inputted from the adder 1531, and a value inputted from the register 1533 to each other, outputs an obtained additional value to the COS_ROM 1534 and the SIN_ROM 1535, and in addition, stores the additional value in the register 1533. That is to say, the adder 1532 and the register 1533 have configurations to function as phase accumulators, and values stored in the register 1533 are gradually increased by every value inputted from the adder 1531 to the adder 1532. Then, the values stored in the register 1533 become the maximum value, and thereafter, return to zero (0) one more time, whereby one cycle elapses. The adder 1532 and the register 1533 are not particularly limited; however, have a data capacity of 32 bits, for example.

The COS_ROM 1534 and the SIN_ROM 1535 are read only memories (ROMs) which store values of a cosine function with an amplitude of 1 and a sine function with an amplitude of 1 in the respective phases in addresses corresponding to the phases concerned, the respective phases being, for example, 256 phases represented by 8 bits and being obtained by equally dividing one cycle of the cosine function and one cycle of the sine function. In the COS_ROM 1534 and the SIN_ROM 1535, when the values of the phases are inputted thereto, the values of the cosine function and the sine function are readout from the corresponding addresses, and are used as a lookup table. In each of the NCOs 153*a* to 153*c*, when 32-bit numeric values are inputted from the adder 1532 to the COS_ROM 1534 and the SIN_ROM 1535, the values of the cosine function and the sine function are read out, for example, from addresses corresponding to phases indicated by values of high-order 8 bits thereamong. Then, these values are sequentially read out at predetermined phase interval and time interval, whereby I-phase local signals LoI and Q-phase local signals LoQ, of which frequency corresponds to these phase interval and time interval, are generated. Note that each of the NCOs 153*a* to 153*c* may perform linear interpolation for the values, which are read out from the COS_ROM 1534 and the SIN_ROM 1535, based on values of low-order 24 bits among the numeric values inputted thereto, and for example, may output 12-bit values.

Here, a setting input value of the IF timing is a value corresponding to a standard intermediate frequency, that is, an intermediate frequency IF0=4.092 MHz in the NCOs 153*a* to 153*c* in this embodiment. Hence, in the case where an offset value (frequency channel) of the intermediate frequency is 0, a local frequency signal of 4.092 MHz is outputted from each of the NCOs 153*a* to 153*c*. Meanwhile, the offset value is changed from 0, whereby it is made possible to increase/reduce the local frequency, which is to be outputted, from 4.092 MHz in a digital manner. In the NCOs 153*a* to 153*c* in this embodiment, a frequency variation Δf corresponding to one (1) as a change of the frequency channel is set at 100 Hz. Hence, the local frequency to be outputted is increased by 100 Hz from the intermediate frequency IF0 every time when the frequency channel is increased by 1, and the local frequency to be outputted is lowered by 100 Hz from the intermediate frequency IF0 every time when the frequency channel is reduced by 1. Hence, for example, in the case of performing the capturing processing within a range of ±15 kHz, the frequency channel is changed within a range from a −150 channel to a +150 channel.

With the above-described configuration, in the capturing engine 151 of this embodiment, the data of at most three (number of maximum parallel processing) frequencies can be processed in parallel.

Next, a description is made of a search procedure of the satellite radiowave in the capturing engine 151 of the satellite radiowave receiving device 1 of this embodiment.

Figure 7:
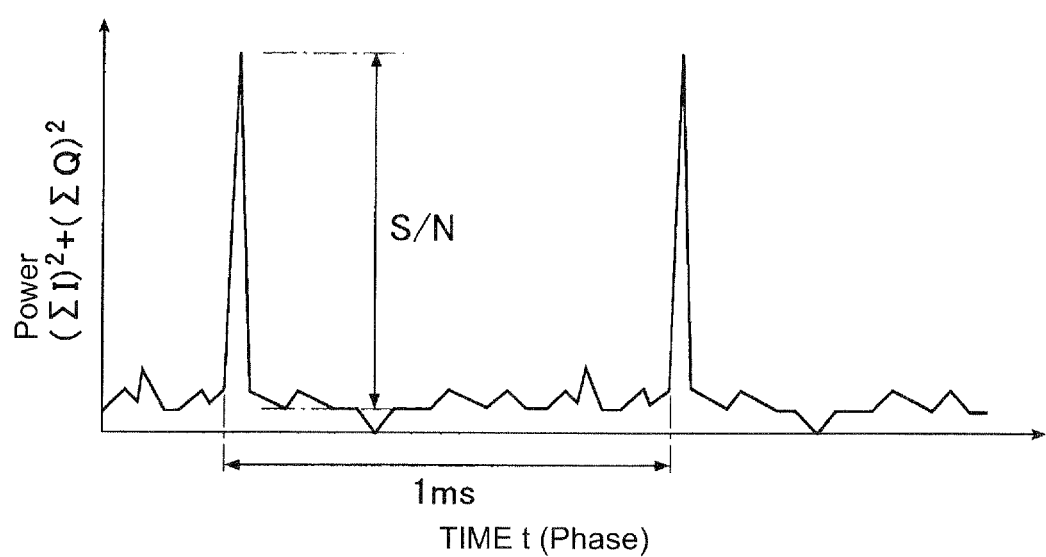
FIG. 7 is a chart showing an example of output data from the capturing engine in a case of generating a C/A code of one GPS satellite and receiving a radiowave from the one GPS satellite at one reception frequency in the capturing engine.
Figure 8:
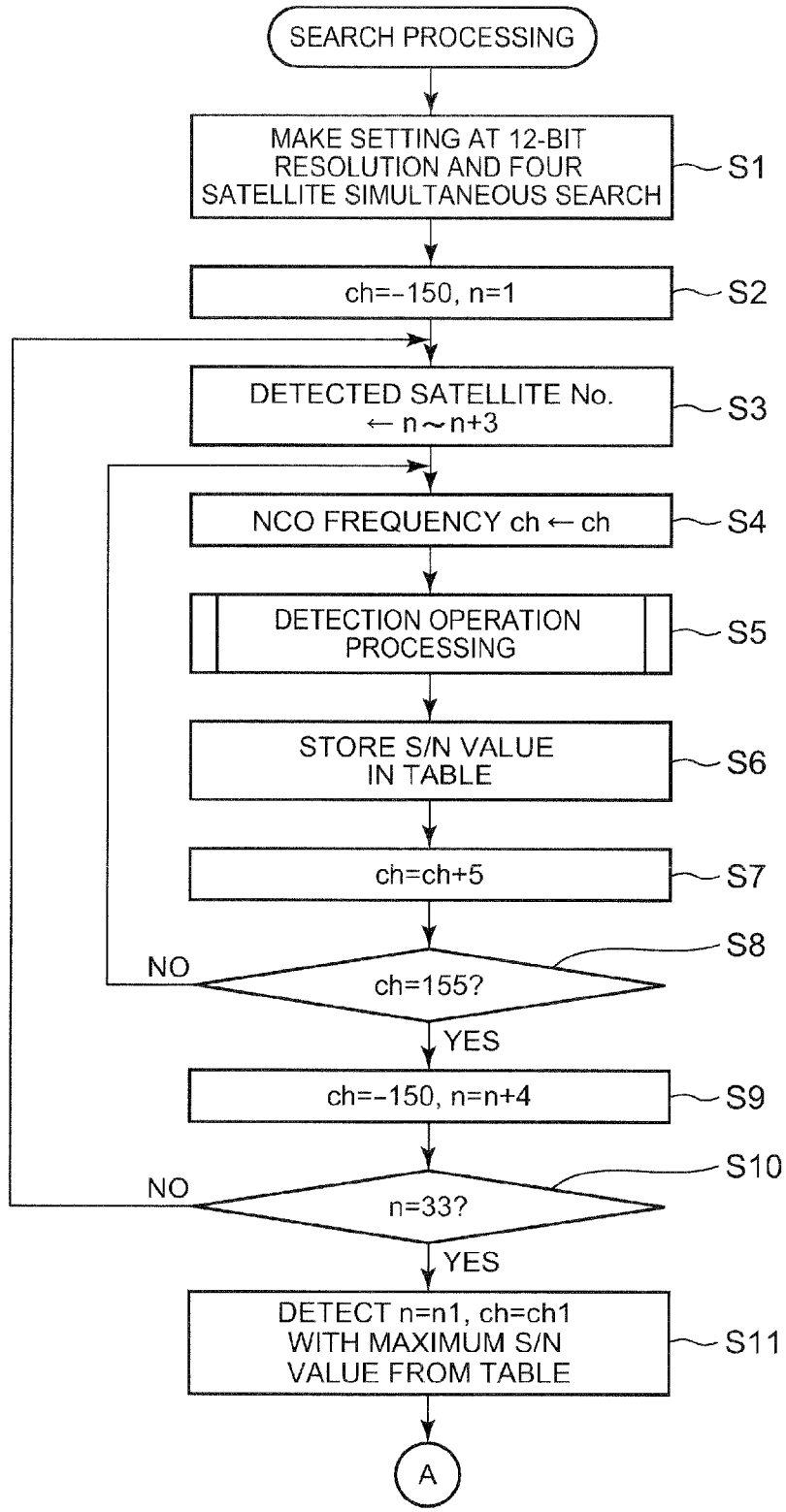
FIG. 8 is a flowchart showing a procedure of control processing to be executed by a CPU of a controller in search processing.

FIG. 7 is a chart showing an example of output data from the capturing engine 151 in the case of generating the C/A code of one GPS satellite and receiving a radiowave from the one GPS satellite at one reception frequency in the capturing engine 151.

Phase differences between 2,046 pieces (1,023 pieces of the I-phase data and 1,023 pieces of the Q-phase data) of the base band data, which are related to one intermediate frequency and are stored in the shift registers 1513*a* and 1513*b*, and 1,023 pieces of the chip data, which indicate one C/A code inputted from the despreading code generation unit 154 to the RAM 1513*c* and selected by the selector 1513*d*, are shifted one by one every time when one piece of data is inputted to the shift registers 1513*a* and 1513*b*. Then, such a phase difference becomes less than one chip once in one cycle of the C/A code. In the spreading code, autocorrelation between data arrays in different phases is very low, and hence, in the case where an amount of the phase difference is equal to or more than one chip, the output value of the capturing engine 151 always becomes a value of an extremely small noise level. As opposed to this, when the phase difference becomes less than one chip, the output value of the capturing engine 151 is suddenly increased. That is to say, it can be determined whether or not the satellite signal is detected based on whether or not this increase of the output value is detected in one cycle in correlation values to be outputted from the first squaring circuit 1514*a* and the second squaring circuit 1514*b*. Accordingly, in the capturing engine 151 of this embodiment, the maximum value in the correlation values for one cycle is selected, and by using an S/N value to be calculated by a ratio of this maximum value and an average value of the respective non-maximum values, it is determined whether or not the satellite signal is detected. Moreover, as the S/N value, for example, a logarithm of the value calculated as described above may be used. Alternatively, the maximum value itself may be compared with a predetermined reference value.

It is necessary to perform the above-descried calculation of the correlation value for the C/A codes of the respective GPs satellites and the respective reception frequencies. Each reception frequency of the radiowaves from the GPS satellites is changed within ranges of influences of the Doppler effect by a moving speed of the GPS satellite with respect to the transmission frequency from the GPS satellite and of an instrument error such as an offset error included in an oscillation frequency of the oscillator circuit 13. In a usual state, this frequency variation Δf is at most approximately ±15 kHz. Hence, the local frequency signals of the intermediate frequencies IF1 to IF3, which are to be individually outputted from the NCOs 153a to 153c in the event of extracting the base band signals from the received radiowave signals converted into the intermediate frequency bands by the down converter 141, are changed from the intermediate frequency IF0 across the frequency variation Δf of the same range, whereby it is necessary to specify the reception frequency. In order to specify the reception frequency with accuracy of approximately 100 Hz, a search operation must be performed in such a manner that the arithmetic operations by the capturing engine 151 are repeatedly performed while switching the frequency variation Δf approximately 300 times.

Accordingly, in the satellite radiowave receiving device 1 of this embodiment, first, as a first search operation, search is performed 60 times per satellite at a frequency interval (first frequency interval) of 500 Hz within a range (first frequency range0 of ±15 kHz. Then, based on the C/A code and the frequency, in which the maximum S/N value is obtained, as a second search operation, another search is performed while obtaining the frequency variation Δf at an interval (second frequency interval) of 100 Hz within a range (second frequency range) of approximately ±400 Hz in which the frequency concerned is centered in the C/A code concerned, whereby the reception frequency is specified.

Next, by using a flowchart, a description is made of an operation procedure of the search processing of the satellite radiowave, which uses the capturing engine 151.

Figure 12:
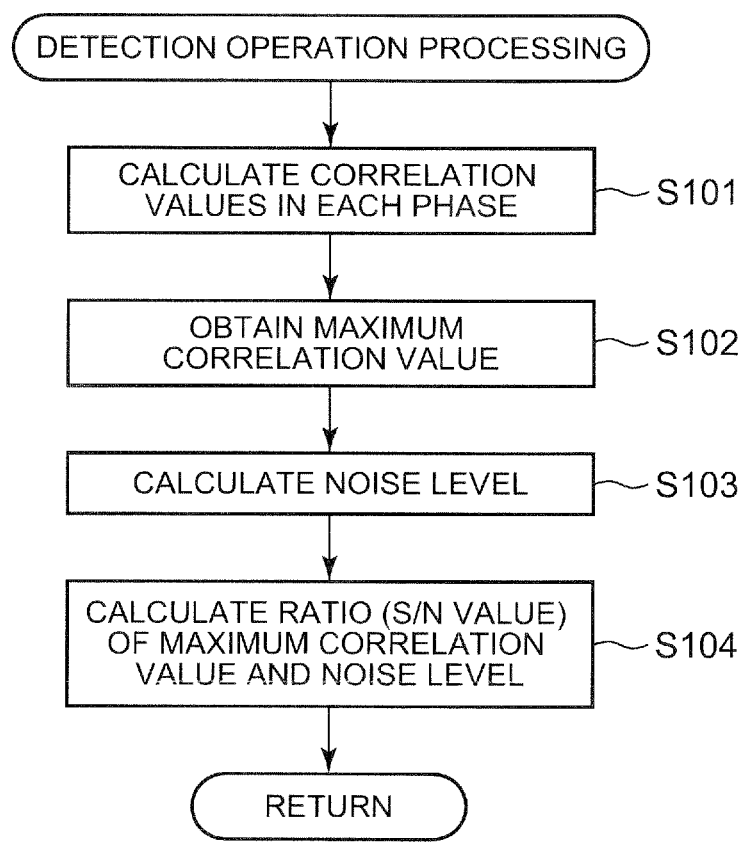
FIG. 12 is a flowchart showing a control procedure of detection operation processing.
Figures 13A, 13B:
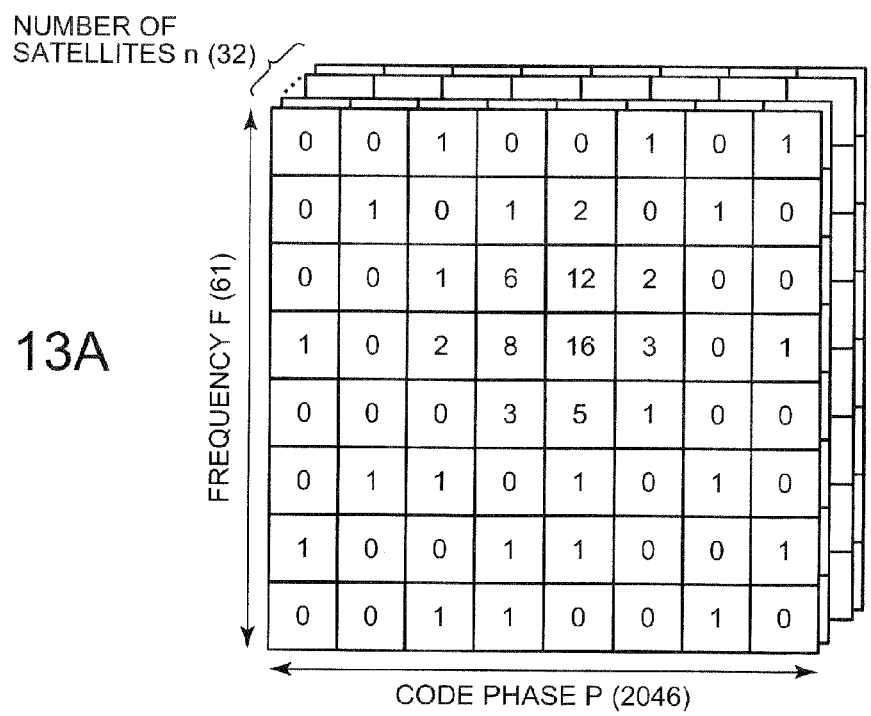
FIGS. 13A and 13B are views showing array patterns of data to be stored in a memory in the search processing.

FIG. 8 to FIG. 11 are flowcharts showing a procedure of control processing to be executed by the CPU of the controller 156 in the search processing for performing the search for the radiowave transmitted by the GPS satellite from the entire ranges of the C/A codes related to all of the GPS satellites and of the set frequencies. Moreover, FIG. 12 is a flowchart showing a control procedure of detection operation processing to be called out individually in FIG. 8 to FIG. 11. Furthermore, FIG. 13A and FIG. 13B are views showing array patterns of data to be stored in the memory 157 in the search processing.

When the search processing is started, the CPU of the controller 156 first sets arithmetic operation setting in the capturing engine 151 at a 12-bit (first bit number) resolution and four satellite simultaneous search (Step S1). Specifically, the CPU makes setting to turn off the switches 1510a and 1510b, the second integrator 1512b, the third integrator 1512c, and the NCOs 153b and 153c, and to input the 12-bit I-phase data FI1 and Q-phase data FQ1 from the first integrator 1512a individually to the shift registers 1513a and 1513b.

Next, as an initial value, the CPU sets the frequency channel ch at "−150", and sets a satellite identification number n at "1" (Step S2).

The CPU sequentially inputs satellite identification numbers n to n+3 as detected satellite numbers to the despreading code generation unit 154, allows the despreading code generation unit 154 to generate and output the C/A codes in the GPS satellites corresponding to the satellite identification numbers n to n+3, and stores the C/A codes concerned in the RAM 1513c (Step S3). Moreover, the CPU sets the set frequency channel ch as the offset value to be inputted to the NCO 153a (Step S4).

When the setting of the variables in Steps S1 to S4 is completed, the CPU of the controller 156 calls out the detection operation processing, and performs the first search operation for the signals transmitted from the GPS satellites (Step S5). In the detection operation processing shown in FIG. 12, the CPU first supplies an operation clock to the whole of the capturing engine 151, sequentially stores the 12-bit I-phase data FI1, which are calculated in the first I/Q conversion unit 1511a and the first integrator 1512a, in the shift register 1513a, and moreover, sequentially stores the 12-bit Q-phase data FQ1, which are calculated in the first I/Q conversion unit 1511a and the first integrator 1512a, in the shift register 1513b. When the 12-bit data are stored in all of the registers which are the shift registers 1513a and 1513b, the CPU operates the selector 1513d before the next I-phase data FI1 is inputted to the shift register 1513a, and allows the selector 1513d to sequentially output the C/A codes of the GPS satellites, which correspond to the satellite identification numbers n to n+3, to the multiplier groups 1513e and 1513f. Then, when the arithmetic operation processing is performed by the C/A code data, the I-phase data FI1 of the shift register 1513a and the Q-phase data FQ1 of the shift register 1513b, and the correlation values are calculated in the first squaring circuit 1514a, the CPU sequentially stores outputs of the correlation values for four satellites as values, in which the frequency channel ch is equal to −150, and the phase P is equal to 0, in the memory 157.

Then, the CPU of the controller 156 operates the selector 1513d every time when the I-phase data FI1 and the Q-phase data FQ1 are inputted to the shift registers 1513a and 1513b alternately one by one and the phase P is changed, and allows the selector 1513d to sequentially output the C/A codes of the GPS satellites, which correspond to the satellite identification numbers n to n+3, to the multiplier groups 1513e and 1513f. Then, when the arithmetic operation processing is performed, and the correlation values are calculated in the first squaring circuit 1514a and the second squaring circuit 1514b, the CPU sequentially stores these correlation values in addresses of the phase P concerned in the memory 157. In the capturing engine 151, the output data of the correlation values, which are obtained by setting three variables, which are the phase P of the C/A code, the reception frequency F (that is, frequency channel ch) and the satellite identification number n, are stored in addresses represented by a three-dimensional array by these three variables as shown in FIG. 13A.

When the correlation values of 2,046 phases in total are stored in the memory 157 (Step S101), the CPU obtains the maximum correlation values, which are obtained individually from the data for four satellites, in each of the frequency channels ch (Step S102). Subsequently, the CPU obtains average values of correlation values other than the maximum values concerned in the frequency channel ch in which the maximum values are obtained and in the GPS satellite, and calculates noise levels (Step S103). Then, the CPU calculates a ratio of the maximum correlation value obtained in the processing of Step S102 and of the correlation value of the noise levels calculated in the processing of Step S103, and defines the calculated ratio as the S/N value (Step S104). Then, the processing of the CPU returns to the search processing.

When the detection operation processing in Step S5 is ended, and the processing of the CPU returns to the search processing, the CPU stores the S/N value, which is obtained in the detection operation processing, and the satellite identification number n, in which the maximum S/N value is obtained, in the memory 157 (Step S6). As shown in FIG. 13B, the frequency channel ch, the satellite identification number n and the S/N value, for which the detection operation processing is performed, are stored in a table.

Next, the CPU adds 5 to the frequency channel ch (Step S7). The CPU determines whether or not a new frequency channel ch is "155" (Step S8). In the case where it is determined that the frequency channel ch is not "155", the processing of the CPU branches to "NO", and returns to Step S9, and the CPU performs the calculation processing for the correlation value in the newly set frequency channel ch (Steps S4 to S7).

Meanwhile, in the case where it is determined that the frequency channel ch is "155" in the determination processing of Step S8, the processing of the CPU branches to "YES". The CPU initializes and returns the frequency channel ch to "−150", and in addition, adds 4 to the satellite identification number n (Step S9).

The CPU determines whether or not the satellite identification number n newly set in the processing of Step S9 is "33" (Step S10). In the case where it is determined that the satellite identification number n is not "33", the processing of the CPU returns to Step S3, and the CPU repeats the processing for obtaining the correlation values for the GPS satellites corresponding to the satellite identification numbers n to n+3, which are newly set as the detected satellite numbers (Steps S3 to S7).

In the case where it is determined that the satellite identification number n is "33" in the determination processing of Step S10, the processing of the CPU shifts to Step S11. The CPU searches the maximum value from among the S/N values stored in the table of the memory 157, which is shown in FIG. 13B, sets a satellite identification number n in the maximum value concerned as a primarily detected satellite identification number n1, and moreover, sets a value of the frequency channel ch therein as a primarily detected channel ch1.

Figure 9:
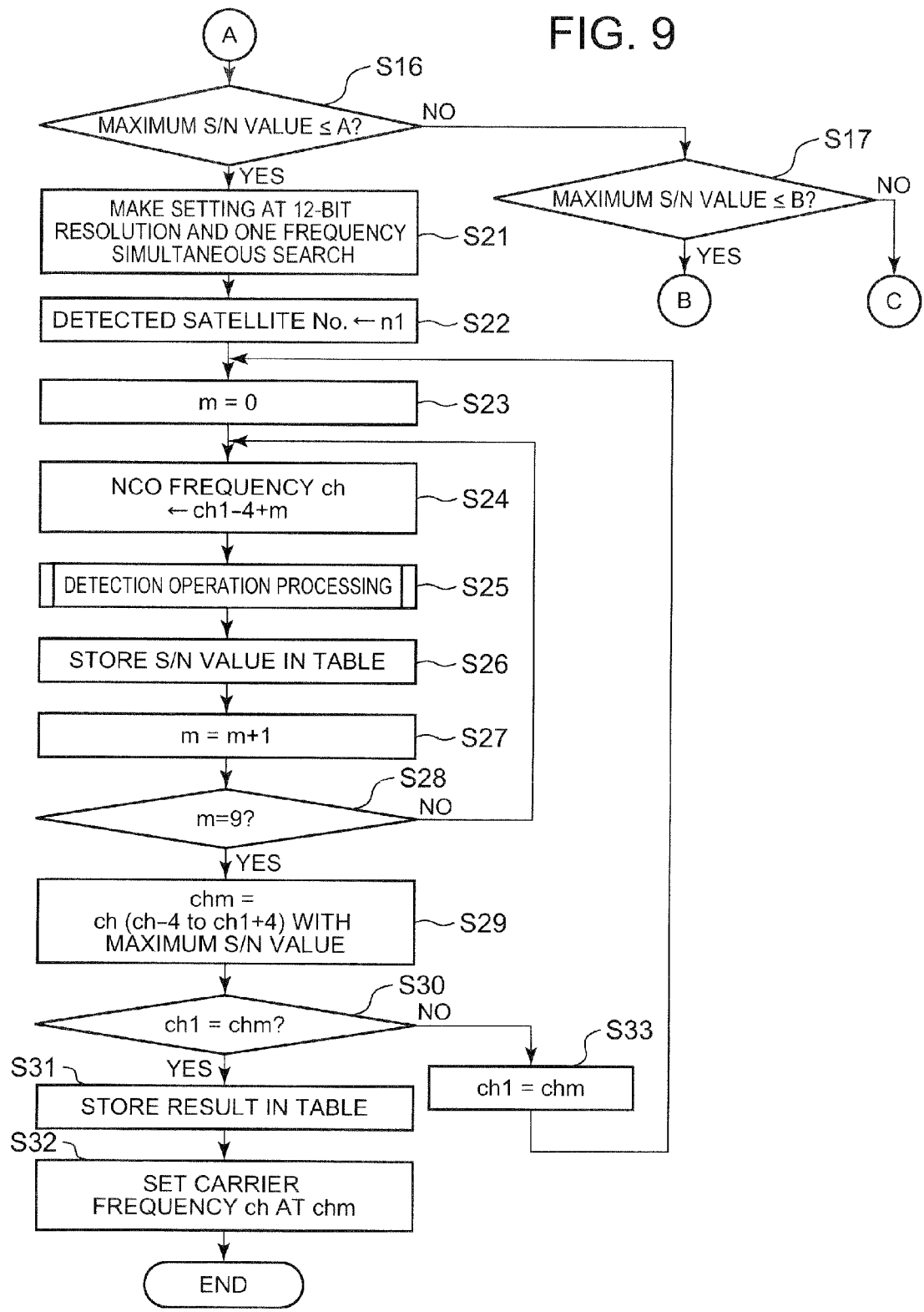
FIG. 9 is a flowchart showing the procedure of the control processing to be executed by the CPU of the controller in the search processing.

When the first search operation is ended by the processing of Step S11, the CPU of the controller 156 starts setting of a second search operation. As shown in FIG. 9, first, the CPU of the controller 156 determines whether or not the obtained maximum S/N value is equal to or less than a predetermined reference value A (Step S16). In the case where it is determined that the maximum S/N value is the reference value A or less, the processing of the CPU branches to "YES", and shifts to Step S21. Moreover, in the case where it is determined that the maximum S/N value is larger than the reference value A, next, the CPU determines whether or not the obtained maximum S/N value is equal to or less than a predetermined reference value B larger than the reference value A (that is, reference value B>reference value A) (Step S17). In the case where it is determined that the maximum S/N value is equal to or less than the predetermined reference value B, the processing of the CPU branches to "YES", and shifts to Step S41. Meanwhile, in the case where it is determined that the maximum S/N value is larger than the predetermined reference value B, the processing of the CPU branches to "NO", and shifts to Step S61.

Here, the reference values A and B are set in response to the obtained maximum S/N value. For example, if a value of the maximum S/N value is a large value that uses high-order 4 bits in 12 bits, then the second search operation can be performed by only the high-order 4 bits while omitting low-order 8 bits. Alternatively, logical sums may be obtained 3 bits by 3 bits adjacent to one another in the 12-bit data, and the 12-bit data may be grouped into 4 bits. Meanwhile, for example, if the value of the maximum S/N value is a value with a size that uses high-order 6 bits in 12 bits, then the second search operation can be performed by only the high-order 6 bits while omitting low-order 6 bits. Alternatively, logical sums may be obtained 2 bits by 2 bits adjacent to each other in the 12-bit data, and the 12-bit data may be grouped into 6 bits. Besides, a combination of these bit number conversion methods may be used, and other bit number conversion methods may be used.

When the maximum S/N value is equal to or less than the reference value A, and the processing of the CPU shifts to Step S21, then as arithmetic operation setting related to second search processing in the capturing engine 151, the CPU sets a resolution (second bit number) at 12 bits, and sets the number (number of parallel processing) of frequencies, for which the search is to be performed in parallel, at 1 frequency (Step S21). Specifically, in a similar way to the first search operation, the CPU keeps on turning off all of the switches 1510a and 1510b, the second integrator 1512b, the third integrator 1512c and the NCOs 153b and 153c, and moreover, inputs the 12-bit data from the first integrator 1512a to the shift registers 1513a and 1513b.

Next, the CPU sets the detected satellite number at the primarily detected satellite identification number n1 (Step S22). Then, the CPU sets the variable m at 0 (Step S23). Moreover, the CPU sets the frequency channel ch at "ch1−4+m", and sets this set frequency channel ch as the offset value to be inputted to the NCO 153a (Step S24).

When the setting is performed by the processing of Steps S21 to S24, the CPU executes second detection operation processing (Step S25). In this detection operation processing, as shown in FIG. 12, the CPU first allows the capturing engine 151 to calculate a correlation value in each of the phases P and each of the frequency channels ch=ch1−4+m by the C/A code of the GPS satellite corresponding to the primarily detected satellite identification number n1. Then, the CPU stores the obtained correlation value in the memory 157 (Step S101). This correlation value is stored in an address represented by a two-dimensional array set by two variables, which are the frequency channel ch and the phase P, on the memory 157.

When such correlation values are obtained for all of the phases P in the set frequency channel ch, and are stored in the memory 157, the CPU obtains the maximum correlation value in the frequency channel ch concerned (Step S102), calculates a noise level (Step S103), and calculates an S/N value in this frequency channel ch (Step S104). Contents of the processing of these Steps S102 to S104 are similar to the contents of the respective pieces of processing in the first detection operation processing executed in Step S5, and a detailed description thereof is omitted. Then, the processing of the CPU returns to the search processing.

When the processing of the CPU returns to the search processing, the CPU stores the obtained S/N value in the table (Step S26).

The CPU adds 1 to the variable m (Step S27). Then, the CPU determines whether or not a value of this variable m is 9 (Step S28). In the case where it is determined that the variable m is not 9, the processing of the CPU returns to Step S24, and the CPU allows the capturing engine 151 to perform the second search operation in the newly set frequency channel ch (Steps S24 to S27). Specifically, in the second search operation in this case, processing for obtaining such S/N values nine times in total at a frequency interval of 100 Hz within a range of ±400 Hz with respect to the reception frequency corresponding to the primarily detected channel ch1 is executed.

Meanwhile, in the case where it is determined that the variable m is 9 in the determination processing in Step S28, the CPU sets, at a secondarily detected channel chm, a value of the frequency channel ch in which the maximum value is obtained among the S/N values calculated in the frequency channels ch=ch1−4 to ch1+4 and stored in the memory 157 (Step S29). Then, the CPU determines whether or not the primarily detected channel ch1 and the secondarily detected channel chm are equal to each other (Step S30). In the case where it is determined that the primarily detected channel ch1 and the secondarily detected channel chm are not equal to each other, the CPU sets a value of the secondarily detected channel chm as the primarily detected channel ch1 (Step S33). Then, the processing of the CPU returns to Step S23, and based on a new primarily detected channel ch1, the CPU repeatedly performs the processing related to the "second search operation" (Step S23 to Step S29). Note that the determination processing of Step S30, the processing of Step S33, and another search processing that is based on the determination result of Step S30 may be omitted.

In the case where it is determined that the primarily detected channel ch1 and the secondarily detected channel chm are equal to each other in the determination processing of Step S30, the CPU stores a result of this search in the table of the memory 157 (Step S31), specifies the secondarily detected channel chm as the carrier frequency (Step S32), and ends the search processing.

Next, a description is made of a processing procedure in the case where the maximum S/N value obtained in the first search operation is larger than A and equal to or less than B, the processing of the CPU branches to "NO" in the determination processing of Step S16, and subsequently, the processing of the CPU branches to "YES" in the determination processing of Step S17.

Figure 10:
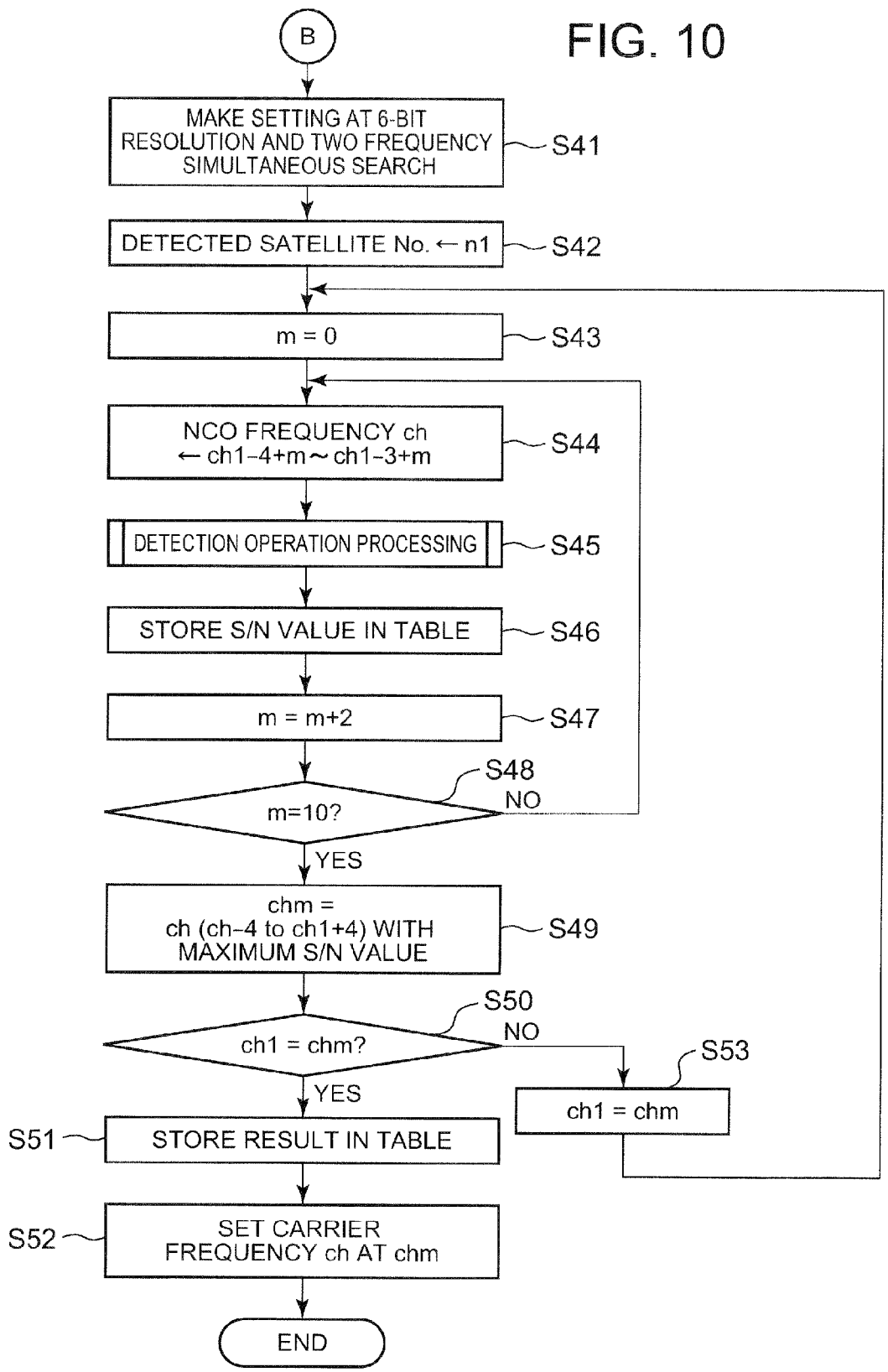
FIG. 10 is a flowchart showing the procedure of the control processing to be executed by the CPU of the controller in the search processing.

In this case, when the processing of the CPU shifts to Step S41, as shown in FIG. 10, first, the CPU of the controller 156 sets the arithmetic operation setting in the capturing engine 151 at a 6-bit resolution and two frequency simultaneous search. Specifically, the CPU makes setting to turn on the switch 1510a, to turn off the switch 1510b, and moreover, to turn on the second integrator 1512b and the NCO 153b, and to keep on turning off the third integrator 1512c and the NCO 153c. Moreover, the CPU makes setting to input the data, which comes from the first integrator 1512a and the second integrator 1512b, to the shift registers 1513a and 1513b, respectively in parallel 6 bits by 6 bits.

Next, the CPU sets the detected satellite number at the primarily detected satellite identification number n1 (Step S42). Then, the CPU sets the variable m at 0 (Step S43). Moreover, the CPU sets the frequency channel ch at "ch1−4+m" and "ch1−3+m", and individually sets these set frequency channels ch as the offset values to be inputted to the NCOs 153a and 153b (Step S44).

When the setting is performed by the processing of Steps S41 to S44, the CPU executes second detection operation processing (Step S45). In this detection operation processing, as shown in FIG. 12, the CPU first allows the capturing engine 151 to calculate correlation values in parallel for the two frequency channels ch=ch1−4+m and ch1−3+m in each of the phases P by the C/A code of the GPS satellite corresponding to the primarily detected satellite identification number n1. Then, the CPU stores the obtained correlation values in the memory 157 (Step S101). These correlation values are stored in the two-dimensional array set by two variables, which are the frequency channel ch and the phase P, on the memory 157. Here, actual addresses on the memory 157, which actually store the obtained correlation values therein, are set on the memory 157a or 157b so as to individually correspond to the first squaring circuit 1514a or the second squaring circuit 1514b, which outputs the correlation values. As described above, the memory 157 is composed so as to be capable of receiving parallel write even if operation timing of the first squaring circuit 1514a and operation timing of the second squaring circuit 1514b overlap each other.

When such correlation values obtained for all of the phases P in the set two frequency channels are stored in the memory 157, the CPU obtains the maximum correlation value for each of the frequency channels ch (Step S102), calculates a noise level for each thereof (Step S103), and calculates an S/N value in each of the frequency channels ch (Step S104). Pieces of the processing of Steps S102 to S104 are similar to the respective pieces of the processing in the detection operation processing executed in Steps S5 and S25, and a detailed description thereof is omitted. In this processing of Step S104 related to the detection operation processing of Step S45, the S/N values in two frequency channels are obtained in parallel by one processing. Then, the processing of the CPU returns to the search processing.

When the processing of the CPU returns to the search processing, the CPU stores the obtained two S/N values in the table (Step S46).

The CPU adds 2 to the variable m (Step S47). Then, the CPU determines whether or not a value of this variable m is 10 (Step S48). In the case where it is determined that the variable m is not 10, the processing of the CPU returns to Step S44, and the CPU allows the capturing engine 151 to perform the search operation in the newly set two frequency channels ch (Steps S44 to S47). Specifically, in the second search operation in this case, the S/N values are obtained once at two frequencies at a frequency interval of 100 Hz within a range of −400 Hz to +500 Hz with respect to the reception frequency corresponding to the primarily detected channel ch1, whereby such calculation processing for the S/N values is performed five times in total.

Meanwhile, in the case where it is determined that the variable m is 10 in the determination processing in Step S48, the CPU sets, at the secondarily detected channel chm, a value of the frequency channel ch in which the maximum value is obtained among the S/N values calculated in the frequency channels ch=ch1−4 to ch1+4 and stored in the memory 157 (Step S49). Then, the CPU determines whether or not the primarily detected channel ch1 and the secondarily detected channel chm are equal to each other (Step S50). In the case where it is determined that the primarily detected channel ch1 and the secondarily detected channel chm are not equal to each other, the CPU sets a value of the secondarily detected channel chm as the primarily detected channel ch1 (Step S53). Then, the processing of the CPU returns to Step S43, and based on a new primarily detected channel ch1, the CPU repeats the respective pieces of the processing related to the second search operation (Step S43 to Step S49).

Note that the determination processing of Step S50, the processing of Step S53, and another search that is based on the determination result of Step S50 can also be omitted.

In the case where it is determined that the primarily detected channel ch1 and the secondarily detected channel chm are equal to each other in the determination processing of Step S50, the CPU stores a result of this search in the table of the memory 157 (Step S51), specifies the secondarily detected channel chm as the carrier frequency (Step S52), and ends the search processing.

As described above, in the case where the maximum S/N value obtained in the first search operation is larger than the reference value A, but is equal to or less than the reference value B larger than this reference value A, the shift registers 1513a and 1513b, of which size is large, are operated as shift registers with a half bit size, which are provided in parallel in two rows, and the second I/Q conversion units 1511b, the second integrator 1512b, the second squaring circuit 1514b, the NCO 153b and the memory 157b, which are other constituent elements, are operated, whereby a time to be required for the second search operation can be shortened without changing the size of the capturing engine 151 to a large extent.

Next, a description is made of a processing procedure in the case where the maximum S/N value is larger than the reference value B, and the processing of the CPU branches to "NO" in both pieces of the determination processing in Steps S16 and S17, and shifts to Step S61.

Figure 11:
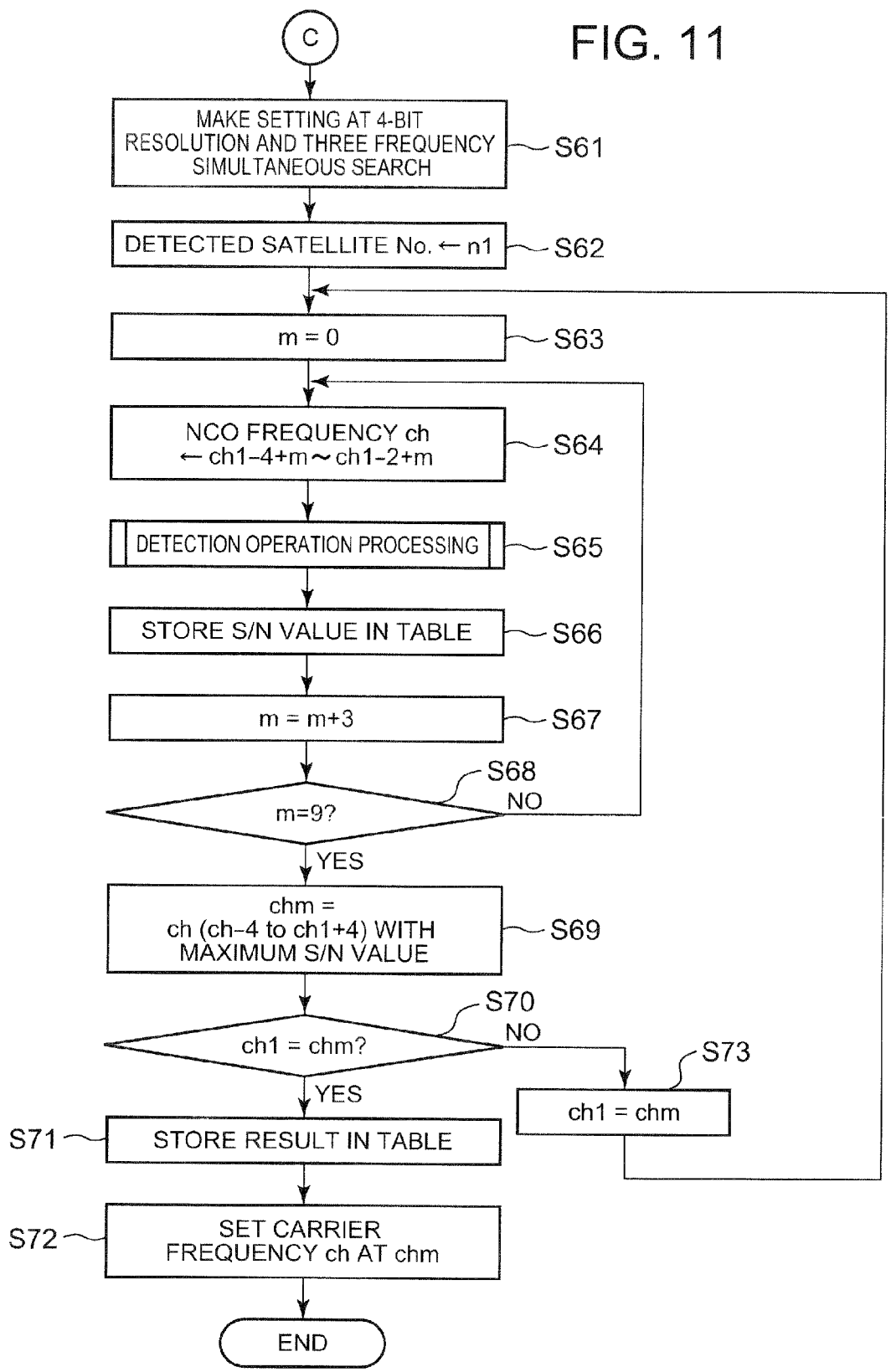
FIG. 11 is a flowchart showing the procedure of the control processing to be executed by the CPU of the controller in the search processing.

When the processing of the CPU shifts to Step S61, as shown in FIG. 11, first, the CPU of the controller 156 sets the arithmetic operation setting in the capturing engine 151 at a 4-bit resolution and three frequency simultaneous search. Specifically, the CPU makes setting to turn on both of the switches 1510a and 1510b, and moreover, to turn on all of the second integrator 1512b, the third integrator 1512c and the NCOs 153b and 153c. Moreover, the CPU makes setting to input the data in parallel 4 bits by 4 bits individually from the first integrator 1512a, the second integrator 1512b and the third integrator 1512c to the shift registers 1513a and 1513b.

Next, the CPU sets the detected satellite number at the primarily detected satellite identification number n1 (Step S62). Then, the CPU sets the variable m at 0 (Step S63). Moreover, the CPU sets the frequency channel chat three types which are "ch1−4+m", "ch1−3+m" and "ch1−2+m", and individually sets these set frequency channels ch as the offset values to be inputted to the NCOs 153a to 153c (Step S64).

When the setting is performed by the processing of Steps S61 to S64, the CPU executes second detection operation processing (Step S65). In this detection operation processing, as shown in FIG. 12, the CPU first allows the capturing engine 151 to calculate correlation values in parallel for the three frequency channels ch=ch1−4+m, ch1−3+m and ch1−2+m in each of the phases P by the C/A code of the GPS satellite corresponding to the primarily detected satellite identification number n1. Then, the CPU stores the obtained correlation values in the memory 157 (Step S101). These correlation values are stored in the two-dimensional array set by two variables, which are the frequency channel ch and the phase P, on the memory 157. Here, actual addresses on the memory 157, which actually store the obtained correlation values therein, are set on the memory 157a, 157b or 157c so as to individually correspond to the first squaring circuit 1514a, the second squaring circuit 1514b or the third squaring circuit 1514c, which outputs the correlation values.

When such correlation values obtained for all of the phases P in the set three frequency channels are stored in the memory 157, the CPU obtains the maximum correlation value for each of the frequency channels ch (Step S102), calculates a noise level for each thereof (Step S103), and calculates an S/N value in each of the frequency channels ch (Step S104). Pieces of the processing of Steps S102 to S104 are similar to the respective pieces of the processing in the detection operation processing executed in Steps S5, S25 and S45, and a detailed description thereof is omitted. In this processing of Step S104 related to the detection operation processing of Step S65, the S/N values in three frequency channels are obtained in parallel by one processing. Then, the processing of the CPU returns to the search processing.

When the processing of the CPU returns to the search processing, the CPU stores the obtained three S/N values in the table (Step S66).

The CPU adds 3 to the variable m (Step S67). Then, the CPU determines whether or not a value of this variable m is 9 (Step S68). In the case where it is determined that the variable m is not 9, the processing of the CPU returns to Step S64, and the CPU allows the capturing engine 151 to perform the search operation in the newly set three frequency channels ch (Steps S64 to S67). Specifically, in the second search operation in this case, the S/N values are obtained once at three frequencies at a frequency interval of 100 Hz within a range of ±400 Hz with respect to the reception frequency corresponding to the primarily detected channel ch1, whereby such calculation processing for the S/N values is performed three times in total.

Meanwhile, in the case where it is determined that the variable m is 9 in the determination processing in Step S68, the CPU sets, at the secondarily detected channel chm, a value of the frequency channel ch in which the maximum value is obtained among the S/N values calculated in the frequency channels ch=ch1−4 to ch1+4 and stored in the memory 157 (Step S69). Then, the CPU determines whether or not the primarily detected channel ch1 and the secondarily detected channel chm are equal to each other (Step S70). In the case where it is determined that the primarily detected channel ch1 and the secondarily detected channel chm are not equal to each other, the CPU sets a value of the secondarily detected channel chm as the primarily detected channel ch1 (Step S73). Then, the processing of the CPU returns to Step S63, and based on a new primarily detected channel ch1, the CPU repeats the respective pieces of the processing related to the second search operation (Step S63 to Step S69).

Note that the determination processing of Step S70, the processing of Step S73, and another search processing that is based on the determination result of Step S70 may be omitted.

In the case where it is determined that the primarily detected channel ch1 and the secondarily detected channel chm are equal to each other in the determination processing of Step S70, the CPU stores a result of this search in the table of the memory 157 (Step S71), specifies the secondarily detected channel chm as the carrier frequency (Step S72), and ends the search processing.

As described above, in the case where the maximum S/N value obtained in the first search operation is larger than the reference value B, the shift registers 1513a and 1513b, of which size is large, are operated as shift registers with a ⅓ bit size, which are provided in parallel in three rows, whereby the time to be required for the second search operation can be further shortened without changing the size of the capturing engine 151 to a large extent.

As described above, in accordance with the satellite radio-wave receiving device 1 of this embodiment, it is possible to receive the satellite signal, which is transmitted on the radio-wave from the GPS satellite, by the receiving antenna ANT, the low noise amplifier (LNA) 11 and the narrow band filter 12, and in the capturing engine 151, the reception frequency and phase of the satellite signal are specified by sweeping the reception frequency and the despreading processing using the correlator 1513. In the event of specifying the reception frequency, first, as the first search operation, the search is performed for all of the frequencies, which have a possibility to be received, by a rough step of 500 kHz, and in the case where the satellite signal is detected, the second search operation is performed by a step of 100 kHz within the range including the frequency concerned, whereby the reception frequency is specified. Moreover, in the second search operation, based on intensity of the satellite signal detected in the first search operation, the number of bits of the receiving signals to be inputted to the shift registers 1513a and 1513b of the correlator 1513 is changed. In this embodiment, the shift registers 1513a and 1513b, which are capable of inputting the data of 12 bits per data sample, are changeable to the configuration capable of the parallel input of two 6-bit data or three 4-bit data, and moreover, can simultaneously output the signals of at most three frequencies. Accordingly, the search operation for the satellite signal is performed simultaneously for the 6-bit data or 4-bit data of the plurality of frequencies, whereby a time until the reception frequency of the satellite signal is specified can be shortened.

Moreover, here, the I/Q conversion unit 1511, the integration unit 1512, the squaring circuit 1514 and the NCO 153, which are the constituent elements for outputting the plurality of frequency signals, each have a sufficiently smaller size in comparison with the shift registers 1513a and 1513b. Accordingly, also by adopting such a configuration of flowing the three-system receiving signals in parallel, the increase of the size is sufficiently suppressed in comparison with a configuration of providing pluralities of the shift registers 1513a and 1513b in parallel. Hence, the internal configurations of the shift registers 1513a and 1513b are changed in the second search operation, and are allowed to cope with the three-system parallel signal processing, whereby the time to be required for the second search operation can be shortened without increasing the size of the capturing engine 151 to a large extent.

Moreover, in particular, the 12-bit digital data equal to the maximum storage capacity per data sample of each of the shift registers 1513a and 1513b is obtained in the event of the first search operation, and in the event of the second search operation, the digital data of the bit number obtained by dividing the 12 bits by the number (1 to 3) of parallel reception frequencies are individually obtained, whereby the storage capacity of each of the shift registers 1513a and 1513b can be set at a necessary and sufficient capacity. Hence, the reception frequency of the satellite signal can be specified for a short time without changing the size of each of the shift registers 1513a and 1513b and wasting the storage capacity thereof.

In the event of the second search operation, the high-order 6 bits are selected from the 12-bit data subjected to the digital conversion in a similar way to the first search operation, and are inputted to the shift registers 1513a and 1513b. Accordingly, the conversion of the input bit number can be performed with ease without changing the configurations of the ADC 143, I/Q conversion unit 1511 and the integration unit 1512.

Moreover, in response to reception intensity of the satellite signal searched in the event of the first search operation, the bit number per data sample of the digital data to be outputted to the shift registers 1513a and 1513b in the event of the second search operation is set so that reception intensity of the satellite signal obtained as a result that the high-order 4 bits or 6 bits are selected cannot be zero. Hence, within the range where it is possible to obtain the necessary information, the bit number is suppressed, and the correlation values for the data related to the plurality of reception frequencies can be calculated in parallel with efficiency.

Moreover, the search of the satellite signal in the capturing engine 151 is performed by obtaining the correlation value between the base band signal of the reception frequency, which is set based on the input values to the NCOs 153a and 153b of the intermediate frequency generation unit 153, and the C/A code that performs the spectrum spread modulation for the satellite signal in the positioning satellite. Accordingly, the search of the satellite signal can be rapidly performed while controlling the frequency stably and easily.

Moreover, the correlation value between the base band signal and the C/A code is obtained by the matched filter (correlator 1513) capable of inputting the digital data of 12 bits per data sample. Then, this matched filter has the configuration capable of inputting the digital data of at most 12 bits in total, which are related to at most three reception frequencies, in parallel in the event of the second search operation, and capable of individually obtaining the correlation values thereof with the C/A code. Accordingly, the calculation of the correlation values in all of the frequencies and all of the phases is accelerated, and in addition, the calculation of the correlation values for the input data of at most three frequencies can be performed in parallel without changing the size of the matched filter.

Moreover, the intermediate frequency generation unit 153 for obtaining the base band signal from the received radiowave signal converted into the intermediate frequency band in the down converter 141 includes the NCOs 153a to 153c independently of one another, allow the NCOs 153a to 153c to output the frequency signals different from one another, and to mix the frequency signals with the received radiowave signal of the intermediate frequency band. In such a way, the intermediate frequency generation unit 153 can allow the NCOs 153a to 153c to input the base band signals of at most three reception frequencies in parallel to the matched filter easily. Moreover, the size of the NCOs 153a to 153c is sufficiently smaller in comparison with the shift registers 1513a and 1513b of the matched filter, and accordingly, even if the NCOs 153a to 153c are provided in parallel, an influence is hardly given to the increase of the size.

Moreover, in the event of the second search operation, the search is performed only within the range of approximately ±500 Hz as an amount of one step of the frequency interval related to the first search operation, the range spreading up and down with respect to the frequency at which the satellite signal is detected in the event of the first search operation. Accordingly, the second search time can be further shortened.

Moreover, the correlation values to be calculated in parallel by the capturing engine 151 in the event of the second search operation and to be outputted from the first squaring circuit 1514a, the second squaring circuit 1514b and the third squaring circuit 1514c are stored in the memories 157a, 157b and 157c independently of one another. Accordingly, even if pieces of the output timing from the first squaring circuit 1514a, the second squaring circuit 1514b and the third squaring circuit 1514c overlap one another, there is no need for concern about a delay of the write timing to the memories.

Moreover, in the first search operation, it is possible to detect the satellite signals from the plurality of GPS satellites in parallel by using the RAM 1513c and the selector 1513d, and in the second search operation, the search is performed only for the satellite signal from the GPS satellite, in which the reception intensity is the highest among the detected satellite signals. Accordingly, the search processing for the satellite signals from the unnecessary GPS satellites is not performed, whereby the shortening of the time of the search processing can be achieved.

Moreover, in the case where the reception data of the plurality of satellites are necessary, it is also possible to perform the second search operation only for the GPS satellites which transmit the satellite signals detected in the first search operation. Accordingly, the search processing for the satellite signals from the unnecessary GPS satellites is not performed, whereby the shortening of the time of the search processing can be achieved.

Note that the present invention is not limited to the above-described embodiment, and is changeable in various ways.

For example, in the above-described embodiment, the data of 12 bits per data sample is inputted to the correlator 1513 capable of storing and processing the digital data of 12 bits per data sample at the time of the first search operation, and the data of 12, 6 or 4 bits is inputted thereto at the time of the second search operation, whereby the setting is made so as not to cause a useless storage capacity; however, a configuration in which extra bits are generated may be adopted as in the case of inputting data of 10, 5 or 3 bits to a correlator capable of storing and processing digital data of 10 bits per data sample.

Moreover, in the above-described embodiment, as the reception intensity of the satellite signal at the time of the first search operation is more intense, such a dynamic range at the time of the second search operation is narrowed; however, on the contrary, such a configuration may be adopted, in which, as the intensity of the satellite signal at the time of the first search operation is weaker, the dynamic range at the time of the second search operation is narrowed, and low-order bit data of the set bit number may be obtained among the 12-bit digital data.

Moreover, in the above-described embodiment, only the reception frequency from the GPS satellite with the highest reception frequency, which is detected by the first search operation, is specified by the second search operation; however, in the case where the satellite signals are detected from the plurality of GPS satellites, the second search operation may be performed individually therefor.

Moreover, the description has been made of the above embodiment by illustrating the GPS positioning satellite as the positioning satellite; however, the positioning satellite is not limited to this. For example, data of a positioning satellite according to other GNSSs such as GALILEO and GLONASS may be used in combination.

Besides, the specific detailed configurations, numeric values, processing order, which are shown in the above-descried embodiment, are appropriately changeable within the scope without departing from the spirit of the present invention.

What is claimed is:

1. A satellite radiowave receiving device comprising:
   a receiving unit which receives a radiowave signal of a frequency band including a transmission frequency of a satellite signal transmitted on a radiowave from a positioning satellite;
   a conversion unit which converts the radiowave signal received by the receiving unit into digital data;
   a detection/arithmetic operation unit which performs a predetermined arithmetic operation to detect the satellite signal in a predetermined reception frequency from the digital data;
   a capturing unit which:
      (i) is configured for the detection/arithmetic operation unit to sequentially obtain input signal data related to reception frequencies, the reception frequencies being set at a first frequency interval across a first frequency range, by every 1 reception frequency at a first bit number equal to or less than a maximum bit number preset per data sample from the digital data, and to perform the predetermined arithmetic operation; and
      (ii) searches a reception frequency at which the satellite signal is detected based on a result of the predetermined arithmetic operation;
   a setting unit which sets:
      (i) a second bit number equal to or less than the first bit number, the second bit number being determined in response to reception intensity in an event where the satellite signal is detected by the capturing unit; and
      (ii) the number of parallel processing in which the detection/arithmetic operation unit is configured to execute the predetermined arithmetic operation in parallel from the input signal data of the second bit number per data sample; and
   a specifying unit which:
      (i) is configured for the detection/arithmetic operation unit to obtain input signal data, the input signal data being related to reception frequencies set at a second frequency interval narrower than the first frequency interval across a second frequency range including the reception frequency at which the satellite signal is detected by the capturing unit, by every reception frequency of the number of parallel processing at the second bit number per data sample from the digital data, and to perform the predetermined arithmetic operation in parallel; and
      (ii) specifies the reception frequency of the satellite signal based on a result of the predetermined arithmetic operation,
   wherein the detection/arithmetic operation unit is configured to execute the predetermined arithmetic operation in parallel for the input signal data related to reception frequencies of which number is equal to or less than a predetermined number of maximum parallel processing, and
   the number of parallel processing is determined so that a total bit number of the data samples of which number is the number of parallel processing is equal to or less than the maximum bit number and equal to or less than the number of maximum processing.

2. The satellite radiowave receiving device according to claim 1,
   wherein the first bit number is equal to the maximum bit number,
   and the number of parallel processing is a value of a quotient obtained by dividing the first bit number by the second bit number.

3. The satellite radiowave receiving device according to claim 1,
   wherein the input signal data of the second bit number is high-order bit data of an amount of the second bit number among the input signal data of the first bit number.

4. The satellite radiowave receiving device according to claim 2,
   wherein the input signal data of the second bit number is high-order bit data of an amount of the second bit number among the input signal data of the first bit number.

5. The satellite radiowave receiving device according to claim 3,
   wherein the second bit number is set so that the reception intensity of the satellite signal detected by the capturing unit is a predetermined value or more.

6. The satellite radiowave receiving device according to claim 4,
   wherein the second bit number is set so that the reception intensity of the satellite signal detected by the capturing unit is a predetermined value or more.

7. The satellite radiowave receiving device according to claim 1,
wherein the detection/arithmetic operation unit:
(i) obtains a base band signal of a set reception frequency as the input signal data; and
(ii) obtains a correlation between the base band signal and spreading code that performs spectrum spread modulation for the satellite signal in the positioning satellite.

8. The satellite radiowave receiving device according to claim 2,
wherein the detection/arithmetic operation unit:
(i) obtains a base band signal of a set reception frequency as the input signal data; and
(ii) obtains a correlation between the base band signal and spreading code that performs spectrum spread modulation for the satellite signal in the positioning satellite.

9. The satellite radiowave receiving device according to claim 7,
wherein the detection/arithmetic operation unit includes a matched filter which obtains the correlation between the base band signal and the spreading code, and
the matched filter is capable of changing a configuration thereof as follows:
(i) based on the number of parallel processing and the second bit number, which are set by the setting unit, to receive in parallel the input signal data of the second bit number related to the reception frequencies of the number of parallel processing; and
(ii) to individually obtain correlations between input signal data of the number of parallel processing and the spreading code.

10. The satellite radiowave receiving device according to claim 8,
wherein the detection/arithmetic operation unit includes a matched filter which obtains the correlation between the base band signal and the spreading code, and
the matched filter is capable of changing a configuration thereof as follows:
(i) based on the number of parallel processing and the second bit number, which are set by the setting unit, to receive in parallel the input signal data of the second bit number related to the reception frequencies of the number of parallel processing; and
(ii) to individually obtain correlations between input signal data of the number of parallel processing and the spreading code.

11. The satellite radiowave receiving device according to claim 7, further comprising:
a local frequency oscillation unit which outputs different frequency signals of the number of maximum parallel processing,
wherein the detection/arithmetic operation unit mixes the digital data with the respective frequency signals to be outputted from the local frequency oscillation unit, and obtains the base band signals of the different reception frequencies in parallel.

12. The satellite radiowave receiving device according to claim 9, further comprising:
a local frequency oscillation unit which outputs different frequency signals of the number of maximum parallel processing,
wherein the detection/arithmetic operation unit mixes the digital data with the respective frequency signals to be outputted from the local frequency oscillation unit, and obtains the base band signals of the different reception frequencies in parallel.

13. The satellite radiowave receiving device according to claim 1,
wherein the second frequency range is set so as to be narrower than the first frequency range, and to individually include at least ranges of the first frequency interval up and down with respect to the reception frequency of the satellite signal detected by the capturing unit.

14. The satellite radiowave receiving device according to claim 2,
wherein the second frequency range is set so as to be narrower than the first frequency range, and to individually include at least ranges of the first frequency interval up and down with respect to the reception frequency of the satellite signal detected by the capturing unit.

15. The satellite radiowave receiving device according to claim 1, further comprising:
an arithmetic operation result storage unit in which, in a case where correlations are obtained in parallel for the reception frequencies of the number of parallel processing by the detection/arithmetic operation unit, values of the correlations obtained in parallel are stored independently of one another.

16. The satellite radiowave receiving device according to claim 2, further comprising:
an arithmetic operation result storage unit in which, in a case where correlations are obtained in parallel for the reception frequencies of the number of parallel processing by the detection/arithmetic operation unit, values of the correlations obtained in parallel are stored independently of one another.

17. The satellite radiowave receiving device according to claim 1,
wherein the capturing unit is capable of detecting in parallel the satellite signals from a plurality of the positioning satellites, and
in a case where the satellite signals from the plurality of positioning satellites are detected by the capturing unit, the specifying unit specifies the reception frequency of the satellite signal from the positioning satellite in which the reception intensity is highest among the detected satellite signals.

18. The satellite radiowave receiving device according to claim 2,
wherein the capturing unit is capable of detecting in parallel the satellite signals from a plurality of the positioning satellites, and
in a case where the satellite signals from the plurality of positioning satellites are detected by the capturing unit, the specifying unit specifies the reception frequency of the satellite signal from the positioning satellite in which the reception intensity is highest among the detected satellite signals.

19. The satellite radiowave receiving device according to claim 1,
wherein the capturing unit is capable of detecting in parallel the satellite signals from a plurality of the positioning satellites, and
in a case where the satellite signals from the plurality of positioning satellites are detected by the capturing unit, the specifying unit individually specifies the reception frequencies of the detected satellite signals from the positioning satellites.

20. The satellite radiowave receiving device according to claim 2, wherein the capturing unit is capable of detecting in parallel the satellite signals from a plurality of the positioning satellites, and in a case where the satellite signals from the plurality of positioning satellites are detected by the capturing unit, the specifying unit individually specifies the reception frequencies of the detected satellite signals from the positioning satellites.

\* \* \* \* \*